US012656699B2

(12) United States Patent
Sugawara et al.

(10) Patent No.: US 12,656,699 B2
(45) Date of Patent: Jun. 16, 2026

(54) METHOD FOR PRODUCING TONER FOR DEVELOPING ELECTROSTATIC CHARGE IMAGE, TONER FOR DEVELOPING ELECTROSTATIC CHARGE IMAGE, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Atsushi Sugawara, Kanagawa (JP); Shinya Sakamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 821 days.

(21) Appl. No.: 17/940,112

(22) Filed: Sep. 8, 2022

(65) Prior Publication Data

US 2023/0305409 A1 Sep. 28, 2023

(30) Foreign Application Priority Data

Mar. 22, 2022 (JP) ................................ 2022-045783

(51) Int. Cl.
*G03G 9/087* (2006.01)
*G03G 9/08* (2006.01)
(Continued)

(52) U.S. Cl.
CPC ......... *G03G 9/0804* (2013.01); *G03G 9/0819* (2013.01); *G03G 9/08711* (2013.01);
(Continued)

(58) Field of Classification Search
CPC .......................... G03G 9/0804; G03G 9/0806
See application file for complete search history.

(56) References Cited

U.S. PATENT DOCUMENTS

2019/0294063 A1* 9/2019 Sato .................. G03G 9/08797

FOREIGN PATENT DOCUMENTS

JP 2013-122050 A 6/2013
JP 2016-057434 A 4/2016
(Continued)

OTHER PUBLICATIONS

Dowfax Safety Data Sheet.*
(Continued)

*Primary Examiner* — Peter L Vajda
(74) *Attorney, Agent, or Firm* — Sughrue Mion, PLLC

(57) ABSTRACT

A method for producing a toner for developing an electrostatic charge image includes preparing a dispersion that contains first resin particles; forming first aggregated particles at a pH of less than 7.0 by adding an aggregating agent to the dispersion so as to aggregate the first resin particles; forming second aggregated particles by adding second resin particles to the dispersion that has undergone the forming of the first aggregated particles so as to aggregate the second resin particles onto the first aggregated particles; adjusting a pH of the dispersion that has undergone the forming of the second aggregated particles to 7.0 or more so as to prepare a dispersion of aggregated particles in which aggregation of the resin particles has been terminated; adding an anionic surfactant to the dispersion having a pH adjusted to 7.0 or more; and forming core-shell toner particles by heating the dispersion containing the anionic surfactant so as to fuse and coalesce the aggregated particles in which aggregation of the resin particles has been terminated. Releasing agent particles are added to the dispersion during the preparing of the dispersion or during the forming of the second aggregated particles, or during both the preparing of the dispersion and the forming of the second aggregated particles.

19 Claims, 2 Drawing Sheets

(51) Int. Cl.
*G03G 9/093* (2006.01)
*G03G 9/097* (2006.01)
*G03G 15/08* (2006.01)

(52) U.S. Cl.
CPC ..... *G03G 9/08755* (2013.01); *G03G 9/09328* (2013.01); *G03G 9/09364* (2013.01); *G03G 9/09371* (2013.01); *G03G 9/09708* (2013.01); *G03G 9/0975* (2013.01); *G03G 15/0877* (2013.01)

(56) References Cited

FOREIGN PATENT DOCUMENTS

| | | | |
|---|---|---|---|
| JP | 2018-18035 | A | 2/2018 |
| JP | 2018-154793 | A | 10/2018 |
| JP | 2019-120764 | A | 7/2019 |
| JP | 2019-168618 | A | 10/2019 |
| JP | 2021-117387 | A | 8/2021 |
| JP | 2021-135468 | A | 9/2021 |
| JP | 2022-181050 | A | 12/2022 |

OTHER PUBLICATIONS

Dowfax product website: https://www.dow.com/en-us/brand/dowfax.html.*

Communication dated Oct. 21, 2025, issued in Japanese Application No. 2022-045783.

Communication dated Feb. 24, 2026 in Japanese Application No. 2022-045783.

* cited by examiner

METHOD FOR PRODUCING TONER FOR DEVELOPING ELECTROSTATIC CHARGE IMAGE, TONER FOR DEVELOPING ELECTROSTATIC CHARGE IMAGE, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-045783 filed Mar. 22, 2022.

BACKGROUND

(i) Technical Field

The present disclosure relates to a method for producing a toner for developing an electrostatic charge image, a toner for developing an electrostatic charge image, an electrostatic charge image developer, a toner cartridge, a process cartridge, an image forming apparatus, and an image forming method.

(ii) Related Art

Methods, such as electrophotography, for visualizing image information are now being used in a variety of fields.

In electrophotography, an electrostatic charge image is formed as image information on a surface of an image bearing member through charging and formation of an electrostatic charge image. Then a toner image is formed on the surface of the image bearing member by using a developer that contains a toner, then transferred onto a recording medium, and then fixed to the recording medium. Image information is visualized into an image through these steps.

For example, Japanese Unexamined Patent Application Publication No. 2019-120764 discloses a method for producing a black toner, the method including a step of aggregating resin particles X containing an amorphous polyester resin A, and surfactant-dispersed carbon black in an aqueous medium, in which the carbon black has a DBP oil absorption of 25 mL/100 g or more and 60 mL/100 g or less.

Japanese Unexamined Patent Application Publication No. 2016-057434 discloses a method for producing a toner for developing an electrostatic charge image, the method including a step 1 of obtaining a mixture (1) that contains a wax and a composite resin that contains a segment made of a polyester resin (a) and a vinyl resin segment that contains a constituting unit derived from a styrene compound; a step 2 of adding an aqueous medium to the mixture (1) obtained in the step 1 and performing phase-inversion emulsification to obtain an aqueous dispersion of wax-containing resin particles (A); and a step 3 of mixing the aqueous dispersion of the wax-containing resin particles (A) and a dispersion of wax particles (C) to aggregate and fuse the wax-containing resin particles (A) and the wax particles (C) so as to obtain a toner, in which the composite resin content in the wax-containing resin particles (A) is 70 mass % or more, and the wax content in the wax particles (C) is 90 mass % or more.

SUMMARY

One example of the method for producing toner particles is an aggregation-coalescence method.

When toner particles containing a releasing agent are to be produced by the aggregation-coalescence method, for example, first, resin particles and releasing agent particles are allowed to aggregate in the presence of an aggregating agent in a dispersion that contains the resin particles, which are particles of a binder resin, and the releasing agent particles, which are particles of a releasing agent. Next, resin particles are further attached to the surfaces of the aggregated particles obtained by aggregation to form aggregated particles having a core-shell structure. Next, after growth of the aggregated particles is terminated by addition of an aggregation terminator, the aggregated particles are heated to be fused and coalesced to obtain toner particles that have a core-shell structure and contain a releasing agent.

However, when toner particles that contain a releasing agent are produced by the aforementioned method, aggregated particles in which the releasing agent is exposed in the surfaces are formed, and coarse particles resulting from coalescence of multiple aggregated particles are likely to be generated. When a toner for developing an electrostatic charge image contains toner particles in which coarse particles have been generated, and is used to form an image, color omission attributable to the coarse particles may occur in the image. In particular, when an image is formed on a recording medium, such as embossed paper, having large surface irregularities (hereinafter such a recording medium may also be referred to as "textured paper"), the color omission in the image is likely to be prominent.

Aspects of non-limiting embodiments of the present disclosure relate to a method for producing a toner for developing an electrostatic charge image, the method including a dispersion preparation step, a first aggregated particle forming step, a second aggregated particle forming step, a pH adjusting step, and a toner particle forming step, and being capable of obtaining an electrostatic charge image developing toner that forms an image with less color omission on textured paper compared to when addition of an anionic surfactant is not performed after the second aggregated particle forming step or compared to when addition of an anionic surfactant is performed before the pH adjusting step and when the toner particle forming step is performed without performing the surfactant adding step after the pH adjusting step.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a method for producing a toner for developing an electrostatic charge image, the method including preparing a dispersion that contains first resin particles; forming first aggregated particles at a pH of less than 7.0 by adding an aggregating agent to the dispersion so as to aggregate the first resin particles; forming second aggregated particles by adding second resin particles to the dispersion that has undergone the forming of the first aggregated particles so as to aggregate the second resin particles onto the first aggregated particles; adjusting a pH of the dispersion that has undergone the forming of the second aggregated particles to 7.0 or more so as to prepare a dispersion of aggregated particles in which aggregation of the resin particles has been terminated; adding an anionic surfactant to the dispersion having a pH adjusted to 7.0 or more; and forming core-shell toner particles by heating the dispersion containing the anionic surfactant so as to fuse and coalesce the aggregated particles in which aggregation of the resin particles has been terminated, in which releasing agent particles are added to the dispersion during the preparing of the dispersion or during the forming of the second aggregated particles, or during both the preparing of the dispersion and the forming of the second aggregated particles.

BRIEF DESCRIPTION OF THE DRAWINGS

Exemplary embodiments of the present disclosure will be described in detail based on the following figures, wherein.

DETAILED DESCRIPTION

Figure 1:
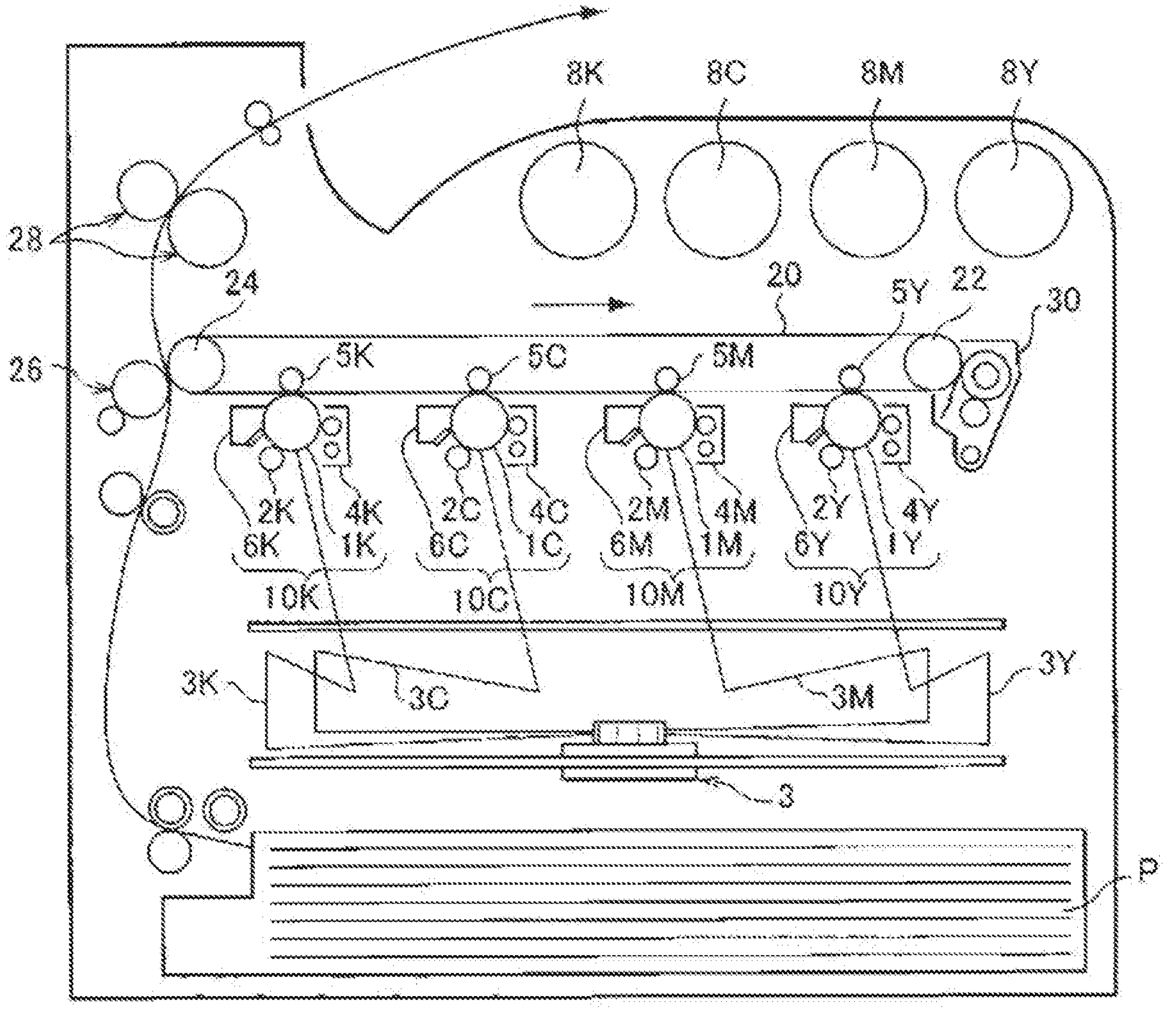
FIG. 1 is a schematic diagram illustrating one example of an image forming apparatus according to an exemplary embodiment.

Exemplary embodiments of the present disclosure will now be described in detail.

In numerical ranges described stepwise, the upper limit or the lower limit of one numerical range may be substituted with an upper limit or a lower limit of a different numerical range also described stepwise.

Furthermore, in any numerical range, the upper limit or the lower limit of the numerical range may be substituted with a value indicated in Examples.

When a composition contains a component and more than one substances that correspond to that component are present in the composition, the amount of that component is a total amount of more than one substances present in the composition unless otherwise noted.

The term "step" refers not only to an independent step but also to any feature that fulfills the intended purpose although such a feature may not be clearly distinguishable from other steps.

Method for producing toner for developing electrostatic charge image A method for producing a toner for developing an electrostatic charge image according to one exemplary embodiment includes a dispersion preparation step of preparing a dispersion containing first resin particles, a first aggregated particle forming step of adding an aggregating agent to the dispersion and forming first aggregated particles by aggregating the first resin particles at a pH of less than 7.0; a second aggregated particle forming step of adding second resin particles to the dispersion that has undergone the first aggregated particle forming step and forming second aggregated particles by causing the second resin particles to aggregate on the first aggregated particles; a pH adjusting step of adjusting the pH of the dispersion which has undergone the second aggregated particle forming step to 7.0 or more to prepare a dispersion of aggregated particles in which aggregation of the resin particles has been terminated; a surfactant adding step of adding an anionic surfactant to the dispersion having a pH adjusted to 7.0 or more, and a toner particle forming step of heating the dispersion containing the anionic surfactant to fuse and coalesce the aggregated particles in which the aggregation of the resin particles has been terminated so as to form core-shell toner particles. In at least one of the dispersion preparation step and the second aggregated particle forming step, releasing agent particles are added to the dispersion.

In the description below, the toner for developing an electrostatic charge image may be simply referred to as a "toner". Furthermore, the first resin particles may be referred to as the "core resin particles", the first aggregated particles may be referred to as the "core aggregated particles", the second resin particles may be referred to as the "shell resin particles", and the second aggregated particles may be referred to as the "core-shell aggregated particles".

The "core-shell structure" refers to a structure that has a core and a shell layer formed on the surface of the core.

As mentioned above, when toner particles that contain a releasing agent are produced by an aggregation-coalescence method, the releasing agent may remain exposed in the surfaces of the produced aggregated particles. When the releasing agent is exposed in the surfaces of the aggregated particles, the aggregated particles are likely to adhere to one another through the releasing agent on the surfaces (in other words, an inter-particle aggregation state is likely to be created). In particular, when the releasing agent particles are present in the dispersion, the aggregated particles are likely to undergo inter-particle aggregation through the releasing agent particles.

When the aggregated particles which have undergone inter-particle aggregation are fused and coalesced, coarse particles are easily generated, and, when an image is formed by using an electrostatic charge image-developing toner that contains toner particles in which coarse particles have occurred, color omission attributable to the coarse particles may occur in the formed image. In particular, when an image is formed on a sheet of textured paper, the color omission in the image is likely to be prominent.

To address this, in this exemplary embodiment, after the second aggregated particle forming step and while the pH is adjusted to 7.0 or more by the pH adjusting step, an anionic surfactant is added to the dispersion containing dispersed core-shell aggregated particles. Thus, compared to when addition of the anionic surfactant is not performed after the second aggregated particle forming step, or compared to when addition of the anionic surfactant is performed before the pH adjusting step and the toner particle forming step is performed after the pH adjusting step without the surfactant adding step, a toner for developing an electrostatic charge image with which an image with less color omission is formed on textured paper can be obtained. Although the reasons for this are not exactly clear, the reasons are presumably as follows.

When an anionic surfactant is added to a dispersion having a pH adjusted to 7.0 or more, anionic hydrophilic groups in the anionic surfactant gain negative charges, and hydrophobic groups in the anionic surfactant adhere to the surfaces of the core-shell aggregated particles. For example, when a releasing agent is exposed in the surfaces of the core-shell aggregated particles, the hydrophobic groups in the anionic surfactant adhere to the releasing agent exposed in the surfaces. Moreover, when releasing agent particles are present in the dispersion, the hydrophobic groups in the anionic surfactant also adhere to the surfaces of the releasing agent particles.

As a result, the surfaces of the individual core-shell aggregated particles gain negative charges. Furthermore, when releasing agent particles are present in the dispersion, the surfaces of the releasing agent particles also gain negative charges. This generates inter-particle repulsion, and, presumably thus, inter-particle aggregation is inhibited despite the exposed releasing agent on the surfaces of the core-shell aggregated particles, generation of coarse particles is inhibited, and color omission attributable to coarse particle is reduced.

It is considered that when the pH of the dispersion to which the anionic surfactant is added is less than 7.0, the anionic hydrophilic groups in the anionic surfactant do not have negative charges, inter-particle repulsion caused by negative charges does not occur, and thus coarse particles are easily generated.

A method for producing a toner according to an exemplary embodiment will now be described in detail.

The method for producing a toner according to this exemplary embodiment includes a dispersion preparation step, a first aggregated particle forming step, a second aggregated particle forming step, a pH adjusting step, a surfactant adding step, and a toner particle forming step, and may further include other steps as needed.

Addition of Releasing Agent Particles

In this exemplary embodiment, releasing agent particles are added to the dispersion during at least one of the dispersion preparation step and the second aggregated particle forming step. As a result, toner particles that contain a releasing agent in at least one of the core and the shell layer are formed.

In this exemplary embodiment, releasing agent particles may be added to the dispersion during only one of the dispersion preparation step and the second aggregated particle forming step so as to form toner particles that contain a releasing agent in only one of the core and the shell layer. Alternatively, releasing agent particles may be added to the dispersion during both the dispersion preparation step and the second aggregated particle forming step so as to form toner particles that contain a releasing agent in both the core and the shell layer.

In this exemplary embodiment, releasing agent particles may be added to the dispersion during the second aggregated particle forming step. Adding the releasing agent particles to the dispersion during the second aggregated particle forming step gives toner particles that contain a releasing agent in the shell layer.

Core-shell aggregated particles having a releasing agent exposed in the surfaces thereof are likely to be formed by adding the releasing agent particles to the dispersion during the second aggregated particle forming step. However, in this exemplary embodiment, since the surfactant adding step of adding an anionic surfactant to the dispersion having a pH adjusted to 7.0 or more is performed, coarse particles are rarely generated despite exposure of the releasing agent in the surfaces of the core-shell aggregated particles, and color omission attributable to the coarse particles is reduced.

The melting temperature of the releasing agent particles is preferably 80° C. or lower, more preferably 78° C. or lower, and yet more preferably 75° C. or lower from the viewpoints of improving fixability of the image formed by using the toner to be obtained and improving the releasability.

Core-shell aggregated particles having a releasing agent exposed in the surfaces thereof are likely to be formed by using releasing agent particles having a low melting temperature. In particular, adding releasing agent particles having a melting temperature of 80° C. or lower to the dispersion during the dispersion preparation step causes the releasing agent in the core of the core-shell aggregated particles to exude over the surfaces and become exposed even when the releasing agent particles are not added to the dispersion during the second aggregated particle forming step.

However, in this exemplary embodiment, since the surfactant adding step of adding an anionic surfactant to the dispersion having a pH adjusted to 7.0 or more is performed, coarse particles are rarely generated despite exposure of the releasing agent in the surfaces of the core-shell aggregated particles, and color omission attributable to the coarse particles is reduced.

From the viewpoints of reducing the exposure in the toner surfaces and reducing the toner fusion attributable to the releasing agent exposed in the toner surfaces during toner storage, the melting temperature of the releasing agent particles is preferably 65° C. or higher.

The melting temperature of the releasing agent particles is preferably 65° C. or higher and 80° C. or lower, more preferably 65° C. or higher and 78° C. or lower, and yet more preferably 65° C. or higher and 75° C. or lower.

The melting temperature of the releasing agent particles may be 50° C. or higher and 110° C. or lower, or may be 60° C. or higher and 100° C. or lower.

The melting temperature is determined from a differential scanning calorimetry (DSC) curve obtained by DSC in accordance with "Melting peak temperature" described in the method for determining the melting temperature in JIS K 7121:1987 "Testing Methods for Transition Temperatures of Plastics".

The individual steps will now be described.

Dispersion Preparation Step

In the dispersion preparation step, a dispersion containing core resin particles is prepared. The core resin particles are particles of a binder resin to be contained in the core of core-shell toner particles to be produced.

The dispersion prepared in the dispersion preparation step may further contain, in addition to the core resin particles, particles of other components to be contained in the core of the toner particles if needed. Examples of the particles of other components include coloring agent particles which are particles of a coloring agent, and releasing agent particles which are particles of a releasing agent.

The details of the binder resin contained in the core of the toner particles and the details of other components, such as a coloring agent and a releasing agent, contained in the core as needed are described below. Here, each of the binder resin contained in the core and the coloring agent and the releasing agent contained in the core as needed may be one substance or two or more substances used in combination.

When the dispersion prepared in the dispersion preparation step contains particles of other components, a dispersion of the core resin particles and a dispersion of particles of other components may be separately prepared and then mixed, or other particles may be added to a dispersion of one type of particles.

Here, the dispersion of the core resin particles is prepared by dispersing core resin particles in a dispersion medium using a surfactant, for example.

An example of the dispersion medium used in the dispersion is an aqueous medium.

Examples of the aqueous medium include water such as distilled water and ion exchange water, and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. Among these, anionic surfactants and cationic surfactants are particularly preferable. The nonionic surfactants may be used in combination with anionic surfactants or cationic surfactants.

One surfactant may be used alone or two or more surfactants may be used in combination.

Examples of the method for dispersing the core resin particles in the dispersion medium include typical dispersing methods that use a rotational shear-type homogenizer, or a mill that uses media such as a ball mill, a sand mill, or a dyno mill. Depending on the type of the core resin particles, the core resin particles may be dispersed in the dispersion by a phase inversion emulsification method, for example.

The phase inversion emulsification method is a method that involves dissolving a resin to be dispersed in a hydrophobic organic solvent that can dissolve the resin, adding a base to the organic continuous phase (O phase) to neutralize, and then adding a water medium (W phase) to the resulting mixture to perform W/O-to-O/W resin conversion (or phase inversion) to form a discontinuous phase and disperse the resin into particles in the water medium.

The volume average particle diameter of the core resin particles to be dispersed in the dispersion is, for example, preferably 0.01 μm or more and 1 μm or less, more preferably 0.08 μm or more and 0.8 μm or less, and yet more preferably 0.1 μm or more and 0.6 μm or less.

The volume average particle diameter of the core resin particles is determined by using a particle size distribution obtained by measurement with a laser diffraction particle size distribution meter (for example, LA-700 produced by Horiba Ltd.), drawing a cumulative distribution with respect to volume from the small-diameter-side relative to the divided particle size ranges (channels), and assuming the particle diameter at 50% accumulation relative to all particles as the volume average particle diameter D50v. The volume average particle diameters of other particles in other dispersions are also measured in the same manner.

The core resin particle content in the dispersion is, for example, preferably 5 mass % or more and 50 mass % or less, and more preferably 10 mass % or more and 40 mass % or less.

A coloring agent particle dispersion and a releasing agent particle dispersion are, for example, prepared as with the dispersion of the core resin particles. In other words, the volume average particle diameter, the dispersion medium, the dispersing method, and the particle content regarding the particles in the dispersion of the core resin particles equally apply to the coloring agent particles dispersed in the coloring agent particle dispersion and the releasing agent particles dispersed in the releasing agent particle dispersion.

First Aggregated Particle Forming Step

In the first aggregated particle forming step, an aggregating agent is added to the dispersion prepared in the dispersion preparation step, and core aggregated particles in which core resin particles contained in the dispersion are aggregated are formed at a pH of less than 7.0. When the dispersion contains particles of other components such as coloring agent particles and releasing agent particles, for example, core aggregated particles in which core resin particles are aggregated with particles of other components (hetero-aggregation) are formed.

Specifically, for example, an aggregating agent is added to the dispersion, and the pH of the dispersion is adjusted to less than 7.0. After a dispersion stabilizer is added as needed, the resulting mixture is heated to a temperature lower than the glass transition temperature of the core resin particles so as to aggregate the particles dispersed in the dispersion and thereby form core aggregated particles.

Examples of the aggregating agent include a surfactant having an opposite polarity to the surfactant used as the dispersing agent added to the mixed dispersion, an inorganic metal salt, and a divalent or higher metal complex. In particular, when a metal complex is used as the aggregating agent, the amount of the surfactant used is reduced, and the charge properties are improved.

In this embodiment, an inorganic metal salt may be used as the aggregating agent. When an inorganic metal salt is used as the aggregating agent and a surfactant adding step of adding an anionic surfactant to the dispersion having a pH adjusted to 7.0 or more is performed as described below, color omission attributable to the coarse particles is further reduced. The reasons for this is not exactly clear, but it is assumed that strong ion bonding between the inorganic metal salt and the anionic surfactant added during the surfactant adding step facilitates control of termination of aggregation, and further reduces generation of coarse particles.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

Among these, a salt compound of a trivalent or higher metal ion is preferably contained and more preferably a trivalent aluminum salt compound is contained as the aggregating agent from the viewpoint of reducing generation of coarse particles.

In adding the aggregating agent in the first aggregated particle forming step, for example, the aggregating agent may be added at room temperature (for example, 25° C.) while stirring the dispersion with a rotational shear-type homogenizer.

The total amount of the aggregating agent added in the first aggregated particle forming step relative to the total mass of the toner particles to be obtained is preferably 0.05 mass % or more and 5.0 mass % or less, more preferably 0.1 mass % or more and 2.0 mass % or less, and yet more preferably 0.5 mass % or more and 1.5 mass % or less. The advantages exhibited when the total amount of the aggregating agent added is within the above-described range are as follows. That is, the aggregating power of the aggregating agent is sufficiently high compared to when the total amount is below the above-described range, and thus there are fewer unaggregated particles in the dispersion; furthermore, the aggregating power of the aggregating agent can be reduced compared to when the total amount is beyond the above-described range, and thus the viscosity of the dispersion in the first aggregated particle forming step can be appropriately adjusted, and generation of coarse particles attributable to stirring failure can be reduced.

In the first aggregated particle forming step, the method for adjusting the pH of the dispersion to less than 7.0 is not particularly limited, and, for example, an aqueous acid solution may be added. Examples of the aqueous acid solution include an aqueous nitric acid solution, an aqueous sulfuric acid solution, an aqueous hydrochloric acid solution, and an aqueous acetic acid solution.

The pH of the dispersion in the first aggregated particle forming step is to be less than 7.0, and, from the viewpoint of aggregating power, is preferably 1.0 or more and 6.0 or less, more preferably 1.0 or more and 5.0 or less, and yet more preferably 1.0 or more and 4.0 or less.

In the first aggregated particle forming step, as described above, heating may be performed after addition of the aggregating agent.

The temperature of the dispersion after addition of the aggregating agent is, for example, lower than Tg° C. where Tg° C. is the glass transition temperature of the core resin particles, and is preferably Tg−30° C. or higher and Tg−5° C. or lower.

When two or more types of resin particles are used as the core resin particles, the glass transition temperature Tg° C. is the lowest glass transition temperature among the glass transition temperatures of the respective resin particles.

Second Aggregated Particle Forming Step

In the second aggregated particle forming step, shell resin particles are added to the dispersion that have undergone the first aggregated particle forming step, and core-shell aggregated particles in which shell resin particles are aggregated on the core aggregated particles are formed. The shell resin particles are particles of a resin contained in the shell layer of the core-shell toner particles to be produced. The resin contained in the shell layer may be the same as or different from the resin contained in the core.

As described above, releasing agent particles may be added to the dispersion during the second aggregated particle forming step. Adding the releasing agent particles during the second aggregated particle forming step gives toner particles that contain a releasing agent in the shell layer.

The details of the resin contained in the shell layer, and the details of other components, such as a releasing agent, contained in the shell layer as needed are described below. Each of the resin contained in the shell layer and the releasing agent contained in the shell layer as needed may be one substance or two or more substances used in combination.

Addition of the shell resin particles may involve adding a shell resin particle dispersion containing shell resin particles dispersed in a dispersion medium to the dispersion which has undergone the first aggregated particle forming step. In such a case, from the viewpoint of promoting formation of the core-shell aggregated particles, the pH of the shell resin particle dispersion may be adjusted to less than 7.0 in advance and then the shell resin particle dispersion may be added to the dispersion which has undergone the first aggregated particle forming step.

When releasing agent particles are added to the dispersion during the second aggregated particle forming step, a shell resin particle dispersion and a releasing agent particle dispersion containing releasing agent particles dispersed in a dispersion medium may be added to the dispersion which has undergone the first aggregated particle forming step. Alternatively, a mixed dispersion in which shell resin particles and releasing agent particles are dispersed in a dispersion medium may be added to the dispersion which has undergone the first aggregated particle forming step.

The shell resin particle dispersion, the releasing agent particle dispersion, and the mixed dispersion are prepared as with the dispersion of the core resin particles described above. The volume average particle diameter, the dispersion medium, the dispersing method, and the particle content regarding the particles in the shell resin particle dispersion, the releasing agent particle dispersion, and the mixed dispersion are the same as those for the dispersion of the core resin particles.

The pH and the temperature of the dispersion in the second aggregated particle forming step are the same as the pH and the temperature of the dispersion in the first aggregated particle forming step.

In the second aggregated particle forming step, the shell resin particles and the releasing agent particles that are added as needed may be added in multiple stages. Multi-stage addition gives toner particles having a shell layer that has a multilayer structure. In the multi-stage addition, the releasing agent particle concentration may differ among the respective stages.

Specifically, for example, the multi-stage addition may involve adding a mixed dispersion containing shell resin particles and releasing agent particles dispersed in a dispersion medium to the dispersion which has undergone the first aggregated particle forming step, and then adding a shell resin particle dispersion thereto. In this manner, toner particles that have a first shell layer containing a resin and a releasing agent and a second shell layer containing a resin arranged in this order from the core are obtained. In the multi-stage addition, the releasing agent particles may not be added during the last stage of adding the shell resin particles.

As described above, in the second aggregated particle forming step, core-shell aggregated particles that have a diameter close to the target diameter of the toner particles are formed.

pH Adjusting Step

In the pH adjusting step, the pH of the dispersion which has undergone the second aggregated particle forming step is adjusted to 7.0 or more to prepare a dispersion of aggregated particles in which aggregation of the resin particles has terminated.

In the pH adjusting step, the method for adjusting the pH of the dispersion to 7.0 or more and terminating the aggregation of the resin particles may involve, for example, adding an aggregation terminator.

An example of the aggregation terminator is a basic compound.

The basic compound may be inorganic basic compound or an organic basic compound. Specific examples thereof include inorganic basic compounds such as sodium hydroxide, potassium hydroxide, and ammonia; organic basic compounds such as tetramethylammonium hydroxide and tetraethylammonium hydroxide; basic alkyl amines such as trimethylamine, diethylamine, triethylamine, tripropylamine, and tributylamine; and alkanol amines such as monoethanolamine, methylethanolamine, diethanolamine, diisopropanolamine, triethanolamine, dimethylaminoethanol, and morpholin.

These basic compounds may be used alone or in combination. Furthermore, due to the ease of removing the basic compound after the treatment, an inorganic basic compound may be used.

When an inorganic metal salt is used as the aggregating agent, a chelating agent may be used as an aggregation terminator. When an inorganic metal salt is used as the aggregating agent, a chelating agent is used as the aggregation terminator, and, as described below, a surfactant adding step of adding an anionic surfactant to the dispersion having a pH adjusted to 7.0 or more is performed, color omission attributable to generation of coarse particles is further reduced. The reasons for this are not clear, but, presumably, adding a chelating agent in the pH adjusting step causes the inorganic metal salt remaining in the dispersion to coordinate with the chelating agent, and thus the aggregating power of the inorganic metal salt can be efficiently reduced.

A water-soluble chelating agent may be used as the chelating agent. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA). One chelating agent may be used alone or two or more chelating agents may be used in combination.

The amount of the chelating agent added relative to, for example, 100 parts by mass of the resin particles is preferably 0.01 parts by mass or more and 5.0 parts by mass or less and more preferably 0.1 parts by mass or more and less than 3.0 parts by mass.

The amount of the chelating agent added in the pH adjusting step relative to a total of 100 parts by mass of the aggregating agent added may be 200 parts by mass or less, 150 parts by mass or less, or 75 parts by mass or less. Even when the amount of the chelating agent added is within the aforementioned range, color omission attributable to generation of coarse particles is reduced by performing the surfactant adding step in this exemplary embodiment. Moreover, since the amount of the chelating agent added is within the aforementioned range, it becomes possible to adjust the amount of the inorganic metal salt remaining in the toner particles and to adjust the degree of ionic bonding in the toner particles; thus, the glossiness of the fixed image can be easily adjusted.

When an inorganic metal salt is used as the aggregating agent, one or both a chelating agent and a basic compound may be used as the aggregation terminator.

The pH of the dispersion that has undergone the pH adjusting step is to be 7.0 or more, and, from the viewpoint of reducing generation of coarse particles, the pH is preferably 7.0 or more and 12.0 or less, more preferably 7.5 or more and 11 or less, and yet more preferably 8 or more and 10 or less.

Surfactant Adding Step

In the surfactant adding step, an anionic surfactant is added to the dispersion having a pH adjusted to 7.0 or more.

Examples of the anionic surfactant include sulfonates in which at least one of an alkyl group and a phenyl group is substituted with a sulfonate salt, such as sodium dodecylbenzene sulfonate and sodium alkyl diphenyl ether disulfonate; metal soaps such as lithium stearate, magnesium stearate, calcium stearate, barium stearate, zinc stearate, calcium ricinolate, barium ricinolate, zinc ricinolate, and zinc octylate; alkyl sulfate esters such as sodium lauryl sulfate, potassium lauryl sulfate, sodium myristyl sulfate, and sodium cetyl sulfate; and phosphate esters. One anionic surfactant may be used alone or two or more anionic surfactants may be used in combination.

The anionic surfactant is preferably a sulfonate or a metal soap from the viewpoint of providing charges by friction, and is more preferably a sulfonate.

The anionic surfactant is preferably a compound having an alkyl group having 8 to 12 carbon atoms, and is more preferably a sulfonate having an alkyl group having 12 carbon atoms.

Using the anionic surfactant having an alkyl group having 8 to 12 carbon atoms further reduces color omission attributable to generation of coarse particles. Although the reasons for this are not exactly clear, it is assumed that the anionic surfactant having an alkyl group having 8 to 12 carbon atoms promotes adhesion of the surfactant to the aggregated particles in the surfactant adding step, and repulsion between the aggregated particles is easily generated.

Adding a sulfonate having an alkyl group having 8 to 12 carbon atoms among anionic surfactants having an alkyl group having 8 to 12 carbon atoms in the surfactant adding step further reduces color omission attributable to generation of coarse particles. Although the reasons for this are not exactly clear, the reasons are presumably that because the anionic surfactant has an alkyl group having 8 to 12 carbon atoms and the anionic hydrophilic group is a sulfonic acid group, the aggregated particles are strongly negatively charged, and thus the repulsive force among the aggregated particles is intensified.

The number of carbon atoms in the alkyl group in the anionic surfactant is preferably 8 or more and 12 or less and is more preferably 12. When the number of carbon atoms in the alkyl group is in this range, color omission attributable to generation of coarse particles is further suppressed compared to when the number is smaller than the aforementioned range. Moreover, when the number of carbon atoms in the alkyl group is in the aforementioned range, the hydrophobicity of the surfactant is reduced compared to when the number is larger than the aforementioned range; thus, the surfactant is easily removed from the toner particles during the washing step, and thus image density variation on textured paper attributable to degraded transferability is reduced.

Specific examples of the anionic surfactant having an alkyl group having 8 to 12 carbon atoms include sodium alkylbenzene sulfonate and sodium alkyl sulfonate each having an alkyl group having 8 to 12 carbon atoms.

In particular, at least one selected from the group consisting of sodium alkylbenzene sulfonate and sodium alkyl sulfonate each having an alkyl group having 8 to 12 carbon atoms is preferably contained in the anionic surfactant having an alkyl group having 8 to 12 carbon atoms from the viewpoint of reducing color omission attributable to generation of coarse particles, and, more preferably, a sodium alkylbenzene sulfonate having an alkyl group having 8 to 12 carbon atoms is contained.

Addition of the anionic surfactant may involve adding a surfactant dispersion containing an anionic surfactant dispersed in a dispersion medium to a dispersion having a pH adjusted to 7.0 or more.

The dispersion medium used in the surfactant dispersion is the same as the dispersion medium used in the dispersion of the core resin particles.

The concentration of the surfactant dispersion may be 25 mass % or less. Adding a surfactant dispersion having a concentration of 25 mass % or less as the anionic surfactant further reduces color omission attributable to coarse particles. The reasons for this are not exactly clear but are presumably that, when the surfactant dispersion has a concentration of 25 mass % or less, the anionic surfactant added to the dispersion having a pH adjusted to 7.0 or more disperses more evenly, thus reducing generation of coarse particles.

From the viewpoint of reducing generation of coarse particles, the concentration of the surfactant dispersion is preferably 25 mass % or less, more preferably 20 mass % or less, and yet more preferably 12 mass % or less. From the viewpoint of the addition rate, the concentration of the surfactant dispersion is preferably 1 mass % or more, more preferably 5 mass % or more, and yet more preferably 10 mass % or more.

The addition rate of the anionic surfactant in the surfactant adding step relative to 100 parts by mass of the aggregated particles in which aggregation of the resin particles has been terminated may be 0.02 parts by mass/minute or more and 2.0 parts by mass/minute or less. When the addition rate of the anionic surfactant is in this range, color omission attributable to coarse particles is further reduced compared to when the addition rate is faster than the aforementioned range. The reasons for this are not exactly clear but are presumably that, when the addition rate of the anionic surfactant is in this range, the anionic surfactant added to the dispersion having a pH adjusted to 7.0 or more disperses more evenly, thus reducing generation of coarse particles. In addition, when the addition rate of the anionic surfactant is in this range, aggregation between aggregated particles in the pH adjusting step can be reduced compared to when the addition rate is slower than the aforementioned range.

The addition rate of the anionic surfactant is preferably 0.02 parts by mass/minute or more and 2.0 parts by mass/minute or less, more preferably 0.02 parts by mass/minute or more and 1.5 parts by mass/minute or less, and yet more preferably 0.02 parts by mass/minute or more and 1.0 parts by mass/minute or less.

The addition of the anionic surfactant may be started within 10 minutes after the pH of the dispersion is adjusted to 7.0 or more. By starting the addition of the anionic surfactant within 10 minutes after the pH of the dispersion is adjusted to 7.0 or more, disintegration of the core-shell aggregated particles is inhibited, and toner particles having a target particle size distribution can be easily obtained.

The time of starting addition of the anionic surfactant after the pH of the dispersion is adjusted to 7.0 or more is preferably 10 minutes or shorter and more preferably 5 minutes or shorter.

The amount of the anionic surfactant added in the surfactant adding step relative to 100 parts by mass of the aggregated particles in which aggregation of the resin particles has been terminated may be 0.02 parts by mass or more and 1.5 parts by mass or less. When the amount of the anionic surfactant added is in this range, color omission attributable to coarse particles is further reduced compared to when the amount is smaller than the aforementioned range. The reasons for this are presumably that, when the amount of the anionic surfactant added is in this range, the anionic surfactant easily adheres evenly to the surfaces of the aggregated particles in which aggregation of the resin particles has been terminated, and thus generation of coarse particles is reduced. When the amount of the anionic surfactant added is in the aforementioned range, the anionic surfactant rarely remains in the formed toner particles compared to when the amount is over the aforementioned range, and the remaining anionic surfactant can be removed in the particle washing step; thus, the density variation in the image formed on textured paper attributable to degradation of transferability is reduced.

The amount of the anionic surfactant added relative to 100 parts by mass of the aggregated particles is preferably 0.02 parts by mass or more and 1.5 parts by mass or less, more preferably 0.05 parts by mass or more and 1.0 parts by mass or less, and yet more preferably 0.05 parts by mass or more and 0.5 parts by mass or less.

When a chelating agent is added as the aggregation terminator in the pH adjusting step, the amount of the anionic surfactant added in the surfactant adding step relative to 100 parts by mass of the chelating agent may be 1 part by mass or more and 100 parts by mass or less. When the amount of the anionic surfactant added is in this range, coordination of the inorganic metal salt and the chelating agent is accelerated compared to when the amount is over the range. The reasons for this are probably that, when the amount of the anionic surfactant added is large, the chelating agent does not sufficiently coordinate with the inorganic metal salt due to bonds between the inorganic metal salt and the anionic surfactant. Moreover, when the amount of the anionic surfactant added is in this range, the adhering power between the surfactant and the aggregated particles is sufficient compared to when the amount is below the aforementioned range.

The amount of the anionic surfactant added relative to 100 parts by mass of the chelating agent is preferably 5 parts by mass or more and 100 parts by mass or less, and more preferably 10 parts by mass or more and 50 parts by mass or less.

Toner Particle Forming Step

In the toner particle forming step, the dispersion combined with the anionic surfactant is heated to fuse and coalesce the aggregated particles in which aggregation of the resin particles has been terminated so as to form core-shell toner particles.

The temperature of the heated dispersion may be equal to or higher than Tg° C., where Tg° C. represents the glass transition temperature of the resin contained in the aggregated particles in which aggregation of the resin particles has been terminated. The temperature of the heated dispersion is preferably higher than Tg° C., more preferably 10° C. or more higher than Tg, and yet more preferably 20° C. or more higher than Tg from the viewpoint of ease of fusing and coalescing the resin particles in the toner particles. The temperature of the heated dispersion is preferably Tg+45° C. or lower and more preferably Tg+40° C. or lower from the viewpoint of suppressing fusion and coalescence of the toner particles.

When two or more resins are contained in the aggregated particles in which aggregation of the resin particles has been terminated, the lowest glass transition temperature among the glass transition temperatures of the respective resin particles is the glass transition temperature Tg° C.

The temperature of the heated dispersion is preferably equal to or higher than higher than Tm° C., which is the melting temperature of the releasing agent contained in the aggregated particles in which aggregation of the resin particles has been terminated, more preferably higher than Tm° C., yet more preferably equal to or higher than Tm+5° C., and particularly preferably equal to or higher than Tm+10° C.

When the temperature of the heated dispersion is equal to or higher than Tm+10° C., the crystalline region of the releasing agent contained in the toner particles becomes larger, and a toner having high fixability and releasability can be easily obtained. Meanwhile, when the temperature of the heated dispersion is equal to or higher than Tm+10° C., the releasing agent is likely to be exposed in the surfaces of the aggregated particles in which aggregation of the resin particles has been terminated; however, in this exemplary embodiment, since the surfactant adding step is performed, coarse particles are rarely generated even when the releasing agent is exposed in the surfaces of the aggregated particles.

The temperature of the heated dispersion is preferably equal to or lower than Tm+30° C. and more preferably equal to or lower than Tm+25° C. from the viewpoint of evenly dispersing the releasing agent domains in the toner particles.

When two or more releasing agents are contained in the aggregated particles in which aggregation of the resin particles has been terminated, the highest melting temperature among the melting temperatures of the respective releasing agents is the melting temperature Tm° C.

In the toner particle forming step, the dispersion combined with the anionic surfactant may be heated to fuse and coalesce the aggregated particles in which aggregation of the resin particles has been terminated, and then cooled.

The time from the start of the heating of the dispersion to the end of the cooling of the dispersion (in other words, the coalescing heating time) is not particularly limited, and, for example, may be 120 minutes or longer and 600 minutes or shorter. Moreover, the heating time is, for example, in a range of 60 minutes or longer and 120 minutes or shorter, and the time from the end of the heating of the dispersion to the start of cooling of the dispersion (in other words, the coalescing time) is, for example, in the range of 60 minutes or longer and 360 minutes or shorter, and the cooling time is, for example, in the range of 40 minutes or shorter.

The temperature of the cooled dispersion is not particularly limited, and may be, for example, a temperature lower than Tg° C. and lower than Tm° C., and may be in the range of 10° C. or higher and 45° C. or lower.

Other Steps

Examples of other steps include a washing step, a solid-liquid separation step, a drying step, and an external additive adding step.

In the washing step, for example, toner particles formed in the toner particle forming step are washed with ion exchange water or the like. The washing step may involve thorough substitution washing using ion exchange water from the viewpoint of chargeability. When toner particles are washed with ion exchange water in the washing step, the temperature of ion exchange water is, for example, in the range of 10° C. or higher and 40° C. or lower, and may be in the range of 15° C. or higher and 35° C. or lower.

In the solid-liquid separation step, for example, the solid component (in other words, the toner particles) in the dispersion of the toner particles is separated from the dispersion medium. The solid-liquid separation step is not particularly limited, and may involve suction filtration, pressure filtration, or the like, from the viewpoint of productivity.

In the drying step, for example, the toner particles which are the separated solid component in the solid-liquid separation step are dried to remove the remaining dispersion medium. The drying step is also not particularly limited, and may involve freeze-drying, air stream drying, flow-drying, vibrational flow drying, or the like, from the viewpoint of productivity.

In the external additive adding step, for example, an external additive is added to the obtained dry toner particles, and the resulting mixture is mixed. Mixing may be performed in, for example, a V blender, a Henschel mixer, or a Loedige mixer.

Toner for Developing Electrostatic Charge Image

A toner for developing an electrostatic charge image according to an exemplary embodiment is obtained by the aforementioned method for producing a toner.

The toner of this exemplary embodiment will now be described in detail.

The toner according to this exemplary embodiment includes toner particles, and, if needed, an external additive.

Toner Particles

The toner particles are composed of, for example, a binder resin, and, if needed, a coloring agent, a releasing agent, and other additives.

Binder Resin

The binder resin preferably contains an amorphous resin, and more preferably contains an amorphous resin and a crystalline resin from the viewpoints of image strength and reducing density variation in the obtained image. In other words, in the first aggregated particle forming step, the resin particles more preferably contain amorphous resin particles and crystalline resin particles.

Here, an amorphous resin refers to a resin that exhibits only a stepwise endothermic change rather than a clear endothermic peak in thermal analysis by differential scanning calorimetry (DSC), that is solid at room temperature, and that turns thermoplastic at a temperature equal to or higher than the glass transition temperature.

In contrast, a crystalline resin refers to a resin that has a clear endothermic peak rather than a stepwise endothermic change in differential scanning calorimetry (DSC).

Specifically, for example, a crystalline resin refers to a resin that has an endothermic peak having a half width of 10° C. or less when measured at a heating rate of 10° C./min, and an amorphous resin refers to a resin that has a half width exceeding 10° C. or has no clear endothermic peak.

The amorphous resin will now be described.

Examples of the amorphous resin include known amorphous resins such as amorphous polyester resins, amorphous vinyl resins (for example, styrene acrylic resin), epoxy resins, polycarbonate resins, and polyurethane resins. Among these, amorphous polyester resins and amorphous vinyl resins (in particular, styrene acrylic resins) are preferable and amorphous polyester resins are more preferable from the viewpoints of suppressing density variation and voids in the obtained image.

An amorphous polyester resin and a styrene acrylic resin may be used in combination as the amorphous resin.

Amorphous Polyester Resin

Examples of the amorphous polyester resin include polycondensation products between polycarboxylic acids and polyhydric alcohols. A commercially available amorphous polyester resin or a synthesized amorphous polyester resin may be used as the amorphous polyester resin.

Examples of the polycarboxylic acids include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, and lower (for example, 1 to 5 carbon atoms) alkyl esters thereof. Among these, aromatic dicarboxylic acids are preferable as the polycarboxylic acids, for example.

A dicarboxylic acid and a tri- or higher carboxylic acid having a crosslinked structure or a branched structure may be used in combination as the polycarboxylic acid. Examples of the tri- or higher carboxylic acid include trimellitic acid, pyromellitic acid, anhydrides thereof, and lower (for example, 1 to 5 carbon atoms) alkyl esters thereof.

These polycarboxylic acids may be used alone or in combination.

Examples of the polyhydric alcohols include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, ethylene oxide adducts of bisphenol A and propylene oxide adducts of bisphenol A). Among these, aromatic diols and alicyclic diols are preferred, and aromatic diols are more preferred as the polyhydric alcohol.

A trihydric or higher alcohol having a crosslinked structure or a branched structure may be used in combination with a diol as the polyhydric alcohol. Examples of the trihydric or higher alcohol include glycerin, trimethylolpropane, and pentaerythritol.

These polyhydric alcohols may be used alone or in combination.

The amorphous polyester resin is obtained by a known production method. Specifically, the amorphous polyester resin is obtained by a method that involves, for example, setting the polymerization temperature to 180° C. or higher and 230° C. or lower, depressurizing the inside of the reaction system as necessary, and performing reaction while removing water and alcohol generated during the condensation.

When the monomers of the raw materials do not dissolve or mix at the reaction temperature, a high-boiling-point solvent may be added as a dissolving aid. In such a case, the polycondensation reaction is performed while distilling away the dissolving aid. When a poorly compatible monomer is present, this monomer may be preliminarily condensed with an acid or an alcohol for which the polycondensation with that monomer is planned, and then polycondensation may be performed with other components.

An example of the binder resin, in particular, the amorphous resin, is a styrene acrylic resin.

A styrene acrylic resin is a copolymer obtained by copolymerizing at least a styrene monomer (a monomer having a styrene skeleton) and a (meth)acrylic monomer (a monomer having a (meth)acryl group, preferably, a monomer having a (meth)acryloxy group). The styrene acrylic resin includes, for example, a copolymer of a styrene monomer and a (meth)acrylate monomer.

The acrylic resin moiety in the styrene acrylic resin is a partial structure obtained by polymerizing one or both of an acrylic monomer and a methacrylic monomer. The term "(meth)acryl" includes both "acryl" and "methacryl".

Specific examples of the styrene monomer include styrene, alkyl-substituted styrene (for example, α-methylstyrene, 2-methylstyrene, 3-methylstyrene, 4-methylstyrene, 2-ethylstyrene, 3-ethylstyrene, and 4-ethylstyrene), halogen-substituted styrene (for example, 2-chlorostyrene, 3-chlorostyrene, and 4-chlorostyrene), and vinylnaphthalene. These styrene monomers may be used alone or in combination.

Among these, styrene can be used as the styrene monomer from the viewpoints of ease of reaction, ease of controlling the reaction, and availability.

Specific examples of the (meth)acrylic monomer include (meth)acrylic acid and (meth)acrylates. Examples of the (meth)acrylates include (meth)acrylic acid alkyl esters (for example, methyl (meth)acrylate, ethyl (meth)acrylate, n-propyl (meth)acrylate, n-butyl (meth)acrylate, n-pentyl (meth)acrylate, n-hexyl acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth) acrylate, n-hexadecyl (meth)acrylate, n-octadecyl (meth) acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth) acrylate, isoheptyl (meth)acrylate, isooctyl (meth)acrylate, 2-ethylhexyl (meth)acrylate, cyclohexyl (meth)acrylate, and t-butylcyclohexyl (meth)acrylate), (meth)acrylic acid aryl esters (for example, phenyl (meth)acrylate, biphenyl (meth) acrylate, diphenylethyl (meth)acrylate, t-butylphenyl (meth) acrylate, and terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. These (meth)acrylic acid monomers may be used alone or in combination.

Among (meth)acrylates among these (meth)acrylic monomers, (meth)acrylates having an alkyl group having 2 to 14 carbon atoms (preferably 2 to 10 carbon atoms and more preferably 3 to 8 carbon atoms) are preferable from the viewpoint of fixability.

In particular, n-butyl (meth)acrylate is preferable, and n-butyl acrylate is more preferable.

The copolymerization ratio of the styrene monomer to the (meth)acrylic monomer (mass basis, styrene monomer/(meth)acrylic monomer) is not particularly limited and can be 85/15 to 70/30.

The styrene acrylic resin may have a crosslinked structure. An example of the styrene acrylic resin having a crosslinked structure is a resin obtained by copolymerizing at least a styrene monomer, a (meth)acrylic acid monomer, and a crosslinking monomer.

Examples of the crosslinking monomer include difunctional or higher crosslinking agents.

Examples of the difunctional crosslinking agent include divinylbenzene, divinylnaphthalene, di(meth)acrylate compounds (for example, diethylene glycol di(meth)acrylate, methylenebis(meth)acrylamide, decanediol diacrylate, and glycidyl (meth)acrylate), polyester-type di(meth)acrylate, 2-([1'-methylpropylideneamino]carboxyamino)ethyl methacrylate.

Examples of the polyfunctional crosslinking agent include tri(meth)acrylate compounds (for example, pentaerythritol tri(meth)acrylate, trimethylolethane tri(meth) acrylate, and trimethylolpropane tri(meth)acrylate), tetra(meth)acrylate compounds (for example, pentaerythritol tetra (meth)acrylate and oligo ester (meth)acrylate), 2,2-bis(4-methacryloxy, polyethoxyphenyl)propane, diallyl phthalate, triallyl cyanurate, triallyl isocyanurate, triallyl trimellitate, and diallyl chlorendate.

In particular, from the viewpoints of fixability and suppressing degradation of the image density and generation of image density variation, the crosslinking monomer is preferably a difunctional or higher (meth)acrylate compound, more preferably a difunctional (meth)acrylate compound, yet more preferably a difunctional (meth)acrylate compound having an alkylene group having 6 to 20 carbon atoms, and particularly preferably a difunctional (meth)acrylate compound having a linear alkylene group having 6 to 20 carbon atoms.

The copolymerization ratio of the crosslinking monomer relative to all monomers (mass basis, crosslinking monomer/all monomers) is not particularly limited and can be 2/1,000 to 20/1,000.

The method for preparing the styrene acrylic resin is not particularly limited, and various polymerization methods (for example, solution polymerization, precipitation polymerization, suspension polymerization, bulk polymerization, and emulsification polymerization) are applied. Known processes (for example, batch, semi-continuous, and continuous methods) are applied to the polymerization reaction.

The styrene acrylic resin preferably accounts for 0 mass % or more and 20 mass % or less, more preferably 1 mass % or more and 15 mass % or less, and yet more preferably 2 mass % or more and 10 mass % or less of the entire binder resin.

The amorphous resin preferably accounts for 60 mass % or more and 98 mass % or less, more preferably 65 mass % or more and 95 mass % or less, and yet more preferably 70 mass % or more and 90 mass % or less of the entire binder resin.

The properties of the amorphous resin will now be described.

The glass transition temperature (Tg) of the amorphous resin is preferably 50° C. or higher and 80° C. or lower and more preferably 50° C. or higher and 65° C. or lower.

The glass transition temperature is determined from a DSC curve obtained by differential scanning calorimetry (DSC), more specifically, according to "extrapolated glass transition onset temperature" described in the method for determining the glass transition temperature in JIS K 7121: 1987 "Testing Methods for Transition Temperatures of Plastics".

The weight average molecular weight (Mw) of the amorphous resin is preferably 5,000 or more and 1,000,000 or less and more preferably 7,000 or more and 500,000 or less.

The number average molecular weight (Mn) of the amorphous resin can be 2,000 or more and 100,000 or less.

The molecular weight distribution Mw/Mn of the amorphous resin is preferably 1.5 or more and 100 or less and more preferably 2 or more and 60 or less.

The weight average molecular weight and the number average molecular weight are measured by gel permeation chromatography (GPC). The molecular weight measurement by GPC is conducted by using GPC-HLC-8120GPC produced by TOSOH CORPORATION as a measuring instrument with columns, TSKgel Super HM-M (15 cm) produced by TOSOH CORPORATION, and a THF solvent. The weight average molecular weight and the number average molecular weight are calculated from the measurement results by using the molecular weight calibration curves obtained from monodisperse polystyrene standard samples.

The crystalline resin will now be described.

Examples of the crystalline resin include known crystalline resins such as a crystalline polyester resin and a crystalline vinyl resin (for example, a polyalkylene resin and a long chain alkyl (meth)acrylate resin). Among these, from the viewpoints of suppressing density variation and voids in the obtained image, a crystalline polyester resin can be used.

Crystalline Polyester Resin

Examples of the crystalline polyester resin include polycondensation products between polycarboxylic acids and polyhydric alcohols. A commercially available crystalline polyester resin or a synthesized crystalline polyester resin may be used as the crystalline polyester resin.

To smoothly form a crystal structure, the crystalline polyester resin can be a polycondensation product obtained by using a linear aliphatic polymerizable monomer rather than a polymerizable monomer having an aromatic ring.

Examples of the polycarboxylic acids include aliphatic dicarboxylic acids (for example, oxalic acid, succinic acid, glutaric acid, adipic acid, suberic acid, azelaic acid, sebacic acid, 1,9-nonandicarboxylic acid, 1,10-decandicarboxylic acid, 1,12-dodecandicarboxylic acid, 1,14-tetradecanedicarboxylic acid, and 1,18-octadecanedicarboxylic acid), aromatic dicarboxylic acids (for example, dibasic acids such as phthalic acid, isophthalic acid, terephthalic acid, and naphthalene-2,6-dicarboxylic acid), anhydrides thereof, and lower (for example, 1 to 5 carbon atoms) alkyl esters thereof.

A dicarboxylic acid and a tri- or higher carboxylic acid having a crosslinked structure or a branched structure may be used in combination as the polycarboxylic acid. Examples of the tricarboxylic acid include aromatic carboxylic acids (for example, 1,2,3-benzenetricarboxylic acid, 1,2,4-benzenetricarboxylic acid, and 1,2,4-naphthalenetricarboxylic acid), anhydrides thereof, and lower (for example, 1 to 5 carbon atoms) alkyl esters thereof.

As the polycarboxylic acid, any of these dicarboxylic acids may be used in combination with a dicarboxylic acid having a sulfonic acid group and a dicarboxylic acid having an ethylenic double bond.

These polycarboxylic acids may be used alone or in combination.

Examples of the polyhydric alcohol include aliphatic diols (for example, linear aliphatic diols having a main chain moiety having 7 to 20 carbon atoms). Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-icosanediol. Among these, 1,8-octanediol, 1,9-nonanediol, and 1,10-decanediol are preferable as the aliphatic diols.

A diol and a trihydric or higher alcohol having a crosslinked structure or a branched structure may be used in combination as the polyhydric alcohol. Examples of the trihydric or higher alcohol include glycerin, trimethylolethane, trimethylolpropane, and pentaerythritol.

These polyhydric alcohols may be used alone or in combination.

The polyhydric alcohol preferably has an aliphatic diol content of 80 mol % or more and more preferably 90 mol % or more.

The melting temperature of the crystalline polyester resin is preferably 50° C. or higher and 100° C. or lower, more preferably 55° C. or higher and 90° C. or lower, and yet more preferably 60° C. or higher and 85° C. or lower.

Here, the melting temperature is determined from a differential scanning calorimetry (DSC) curve obtained by DSC in accordance with "Melting peak temperature" described in the method for determining the melting temperature in JIS K 7121:1987 "Testing Methods for Transition Temperatures of Plastics".

The weight-average molecular weight (Mw) of the crystalline polyester resin may be 6,000 or more and 35,000 or less.

The crystalline polyester resin is, for example, obtained by a known production method as with the amorphous polyester resin.

From the viewpoints of smoothly forming a crystal structure and improving image fixability achieved by good compatibility with the amorphous polyester resin, the crystalline polyester resin can be a polymer formed between $\alpha,\omega$-linear aliphatic dicarboxylic acid and $\alpha,\omega$-linear aliphatic diol.

As $\alpha,\omega$-linear aliphatic dicarboxylic acid, $\alpha,\omega$-linear aliphatic dicarboxylic acid in which the alkylene group linking the two carboxy groups has 3 to 14 carbon atoms is preferable, and the alkylene group more preferably has 4 to 12 carbon atoms, and yet more preferably has 6 to 10 carbon atoms.

Examples of $\alpha,\omega$-linear aliphatic dicarboxylic acid include succinic acid, glutaric acid, adipic acid, 1,6-hexanedicarboxylic acid (also known as suberic acid), 1,7-heptanedicarboxylic acid (also known as azelaic acid), 1,8-octanedicarboxylic acid (also known as sebacic acid), 1,9-nonandicarboxylic acid, 1,10-decanedicarboxylic acid, 1,12-dodecanedicarboxylic acid, 1,14-tetradecanedicarboxylic acid, and 1,18-octadecanedicarboxylic acid, among which 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferable.

These $\alpha,\omega$-linear aliphatic dicarboxylic acids may be used alone or in combination.

As $\alpha,\omega$-linear aliphatic diol, $\alpha,\omega$-linear aliphatic diol in which the alkylene group linking the two hydroxy groups has 3 to 14 carbon atoms is preferable, and the alkylene group more preferably has 4 to 12 carbon atoms, and yet more preferably has 6 to 10 carbon atoms.

Examples of the $\alpha,\omega$-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol, among which 1,6-hexanediol, 1,7-heptanediol, 1,8-octanediol, 1,9-nonanediol, and 1,10-decanediol are preferable.

These α,ω-linear aliphatic diols may be used alone or in combination.

From the viewpoints of smoothly forming a crystal structure and improving image fixability achieved by good compatibility with the amorphous polyester resin, the polymer formed between α,ω-linear aliphatic dicarboxylic acid and α,ω-linear aliphatic diol is preferably a polymer formed between at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol, and is more preferably a polymer formed between 1,10-decanedicarboxylic acid and 1,6-hexanediol.

The crystalline resin preferably accounts for 1 mass % or more and 25 mass % or less, more preferably 2 mass % or more and 20 mass % or less, and yet more preferably 5 mass % or more and 15 mass % or less of the entire binder resin.

Other Binder Resins

Examples of the binder resin include homopolymers obtained from monomers such as ethylenically unsaturated nitriles (for example, acrylonitrile and methacrylonitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene), and copolymers obtained from two or more of these monomers.

Other examples of the binder resin include non-vinyl resins such as epoxy resins, polyurethane resins, polyamide resins, cellulose resins, polyether resins, and modified rosin, mixtures of these non-vinyl resins and the aforementioned vinyl resins, and graft polymers obtained by polymerizing a vinyl monomer in the presence of these resins.

These binder resins may be used alone or in combination.

The binder resin content relative to the entire toner particles is preferably 40 mass % or more and 95 mass % or less, more preferably 50 mass % or more and 90 mass % or less, and yet more preferably 60 mass % or more and 85 mass % or less.

Releasing Agent

Examples of the releasing agent include hydrocarbon wax; natural wax such as carnauba wax, rice wax, and candelilla wax; synthetic or mineral or petroleum wax such as montan wax; and ester wax such as fatty acid esters and montanic acid esters. The releasing agent is not limited to these.

The releasing agent content relative to the entire toner particles is, for example, preferably 1 mass % or more and 20 mass % or less and more preferably 5 mass % or more and 15 mass % or less.

Coloring Agent

Examples of the coloring agent include various pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

These coloring agents may be used alone or in combination.

The coloring agent may be surface-treated as necessary, or may be used in combination with a dispersing agent. Multiple coloring agents may be used in combination.

The coloring agent content relative to the entire toner particles is, for example, preferably 1 mass % or more and 30 mass % or less and more preferably 3 mass % or more and 15 mass % or less.

Other Additives

Examples of other additives include known additives such as magnetic materials, charge controllers, and inorganic powders. These additives are contained in the toner particles as internal additives.

Properties and Other Features of Toner Particles

As described above, the toner particles have a core-shell structure that has a core and a shell layer that covers the surface of the core.

The toner particles contain a releasing agent in at least one of the core and the shell layer. The releasing agent may be contained in one or both of the core and the shell layer of each toner particle.

The toner particles may have a core that contains a binder resin, a releasing agent, and, if needed, a coloring agent and other additives, and a shell layer that contains a resin. Alternatively, the toner particles may have a core that contains a binder resin and, if needed, a coloring agent and other additives, and a shell layer that contains a resin and a releasing agent. Alternatively, the toner particles may have a core that contains a binder resin, a releasing agent, and, if needed, a coloring agent and other additives, and a shell layer that contains a resin and a releasing agent.

As mentioned above, the shell layer of the toner particles may have a single layer structure or a multilayer structure. One example of the toner particles that have a shell layer having a multilayer structure is the one that has a core that contains a binder resin, and, if needed a coloring agent and other additives, a first shell layer that contains a resin and a releasing agent, and a second shell layer that contains a resin.

When the shell layer has a multilayer structure, the thickness of the outermost layer of the shell layer is preferably 120 μm or less, more preferably 30 μm or more and 120 μm or less, and yet more preferably 50 μm or more and 100 μm or less from the viewpoint of improving fixability and releasability.

The toner particles may contain the releasing agent in a region that extends to a depth of 200 μm or less from a surface. When a releasing agent is contained in the region that extends to a depth of 200 μm or less from the surface, the releasing agent easily exudes onto the surface of the toner image during the process of fixing the toner image onto a recording medium, and fixability and releasability are improved. However, during the process of producing toner particles that contain a releasing agent in the region that extends to a depth of 200 μm or less from the surface, aggregated particles in which the releasing agent are exposed in the surfaces are likely to be obtained. However, since the surfactant adding step has been performed in this exemplary embodiment, coarse particles are rarely generated even when the releasing agent is exposed in the surfaces of the aggregated particles. Thus, although the toner particles contained in the toner of the exemplary embodiment contain the releasing agent in a region that extends to a depth of 200 μm or less from the surface, color omission attributable to coarse particles is reduced.

The method for checking whether or not the releasing agent is contained in the region that extends to a depth of 200 μm or less from the surface is, for example, as follows.

Specifically, toner particles (or toner particles with an external additive attached thereto) are mixed with an epoxy resin to be buried, and the epoxy resin is solidified to obtain a solidified sample. The solidified sample is cut into a thin sample having a thickness of 80 nm or more and 130 nm or less with an ultramicrotome (Ultracut UCT produced by LEICA corporation). Next, the obtained thin sample is stained with ruthenium tetroxide for 3 hours in a 30° C. desiccator. Next, ultrahigh resolution field-emission scanning electron microscope (FE-SEM, S-4800 produced by Hitachi High-Technologies Corporation) is used to obtain a transmission image-mode STEM observation image (accelerating voltage: 30 kV, magnification: 20000×) of the stained thin sample.

In the toner particles, the binder resin (in other words, the crystalline resin and the amorphous resin) and the releasing agent are identified from the contrast and the profile. In the STEM observation image, the binder resin other than the releasing agent has many double bonds and is stained with ruthenium tetroxide, and thus the releasing agent portion and the resin portion other than the releasing agent are identified. More specifically, due to ruthenium staining, a releasing agent is most lightly stained, a crystalline resin (for example, a crystalline polyester resin) is next most lightly stained, and an amorphous resin (for example, an amorphous polyester resin) is stained most deeply. By adjusting the contrast, the releasing agent emerges as white, the amorphous resin emerges as black, and the crystalline resin emerges as light gray in the observation. In this manner, the domains of the releasing agent are identified.

Next, in the obtained STEM observation image, the distance from the surface of the toner particle to a depth of 200 μm is measured, and the presence of domains of the releasing agent can be confirmed.

Note that an example of the method for obtaining toner particles that contain a releasing agent in the region that extends a depth of 200 μm or less from the surface is a method that involves adding releasing agent particles to the dispersion in the second aggregated particle forming step in the aforementioned toner production method.

The volume average particle diameter (D50v) of the toner particles is preferably 2 μm or more and 10 μm or less and more preferably 4 μm or more and 8 μm or less.

From the viewpoint of reducing color omission in the image, the large diameter-side volume particle-size distribution index (oversize GSDv) of the toner particles is preferably 1.25 or less, more preferably 1.23 or less, and yet more preferably 1.22 or less.

Various average particle diameters and various particle size distribution indices of the toner particles are measured with Coulter Multisizer II (produced by Beckman Coulter Inc.) with ISOTON-II (produced by Beckman Coulter Inc.) as the electrolyte.

In measurement, 0.5 mg or more and 50 mg of a measurement sample is added to 2 mL of a 5% aqueous solution of a surfactant (for example, sodium alkylbenzene sulfonate) serving as a dispersing agent. The resulting mixture is added to 100 mL or more and 150 mL of the electrolyte.

The electrolyte in which the sample has been suspended is dispersed with an ultrasonic disperser for 1 minute, and the particle size distribution of the particles having a particle diameter in the range of 2 μm or more and 60 μm or less is measured by using Coulter Multisizer II (produced by Beckman Coulter Inc.) with a 100 μm aperture. The number of particles sampled is 50000.

Relative to the particle size ranges (channels) divided on the basis of the particle size distribution to be measured, the volume and the number are plotted from the small diameter side to draw cumulative distributions. The particle diameters at a cumulative percentage of 16% are defined to be a volume particle diameter D16v and a number particle diameter D16p, the particle diameters at a cumulative percentage of 50% are defined to be a volume average particle diameter D50v and cumulative number-average particle diameter D50p, and the particle diameters at a cumulative percentage of 84% are defined to be the volume particle diameter D84v and the number particle diameter D84p.

These results are used to calculate the large diameter-side volume particle size distribution indicator (oversize GSDv) as (D84v/D50v).

The average circularity of the toner particles is preferably 0.94 or more and 1.00 or less and more preferably 0.95 or more and 0.98 or less.

The average circularity of the toner particles is determined from (circle-equivalent perimeter)/(perimeter) [(perimeter of a circle having the same projection area as the particle image)/(perimeter of a particle projection image)]. Specifically, it is the value measured by the following method.

First, toner particles to be measured are sampled by suction, and are allowed to form a flat flow. Particle images are captured as still images by performing instantaneous strobe light emission, and these particle images are analyzed by a flow-type particle image analyzer (FPIA-3000 produced by Sysmex Corporation) to determine the average circularity. In determining the average circularity, 3500 particles are sampled.

When the toner contains an external additive, the toner (developer) to be measured is dispersed in surfactant-containing water, and then ultrasonically treated to obtain toner particles from which the external additive has been removed.

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)n$, $Al_2O_3{\cdot}2SiO_2$, $CaCO_3$, $MgCO_3$, $BaSO_4$, and $MgSO_4$.

The surfaces of the inorganic particles serving as an external additive may be hydrophobized. The hydrophobizing treatment involves, for example, immersing inorganic particles in a hydrophobizing agent. The hydrophobizing agent is not particularly limited, and examples thereof include silane coupling agents, silicone oil, titanate coupling agents, and aluminum coupling agents. These may be used alone or in combination.

The amount of the hydrophobizing agent is, typically, 1 part by mass or more and 10 parts by mass or less relative to 100 parts by mass of the inorganic particles, for example.

Examples of the external additive also include resin particles (resin particles such as polystyrene, polymethyl methacrylate (PMMA), and melamine resin), and cleaning activating agents (for example, particles of metal salts of higher fatty acids such as zinc stearate, and particles of fluorine polymers).

The amount of the external additive externally added relative to the toner particles is, for example, preferably 0.01 mass % or more and 5 mass % or less and more preferably 0.01 mass % or more and 2.0 mass % or less.

Electrostatic Charge Image Developer

The electrostatic charge image developer of this exemplary embodiment contains at least the toner of the exemplary embodiment.

The electrostatic charge image developer of this exemplary embodiment may be one-component toner containing only the toner of the exemplary embodiment, or a two-component developer that is a mixture of the toner and a carrier.

The carrier is not particularly limited and may be any known carrier. Examples of the carrier include a coated carrier obtained by covering a surface of a core formed of a magnetic powder with a coating resin; a magnetic powder-dispersed carrier in which a magnetic powder is dispersed and blended in a matrix resin; and a resin-impregnated carrier in which a porous magnetic powder is impregnated with a resin.

The magnetic powder-dispersed carrier and the resin-impregnated carrier may each be constituted by a core formed of a constituent particle of the carrier, and a coating resin covering the core.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, an organosiloxane bond-containing straight silicone resin and modified products thereof, a fluororesin, polyester, polycarbonate, phenolic resin, and epoxy resin.

The coating resin and the matrix resin may each contain other additives such as conductive particles.

Examples of the conductive particles include particles of metals such as gold, silver, and copper, and particles of carbon black, titanium oxide, zinc oxide, tin oxide, barium sulfate, aluminum borate, and potassium titanate.

Here, an example of the method for coating the surface of the core with a resin include a method that involves coating the surface of the core with a coating layer-forming solution prepared by dissolving a coating resin and, if needed, various additives in an appropriate solvent. The solvent is not particularly limited, and may be selected in view of the type of the coating resin used, application suitability, etc.

Specific examples of the resin coating method include a dipping method that involves dipping a core in a coating layer-forming solution, a spraying method that involves spraying a coating layer-forming solution onto the surface of the core, a flow bed method that involves spraying a coating layer-forming solution while the core floats on flowing air, and a kneader coater method that involves mixing the core for the carrier and a coating layer-forming solution in a kneader coater and removing the solvent.

The toner-to-carrier mixing ratio (mass ratio) in the two-component developer is preferably 1:100 to 30:100, and more preferably 3:100 to 20:100.

Image Forming Apparatus and Image Forming Method

An image forming apparatus and an image forming method according to exemplary embodiments will now be described.

An image forming apparatus according to an exemplary embodiment includes an image bearing member, a charging unit that charges a surface of the image bearing member, an electrostatic charge image forming unit that forms an electrostatic charge image on the charged surface of the image bearing member, a developing unit that stores an electrostatic charge image developer and develops the electrostatic charge image on the surface of the image bearing member into a toner image by using the electrostatic charge image developer, a transfer unit that transfers the toner image on the surface of the image bearing member onto a surface of a recording medium, and a fixing unit that fixes the transferred toner image on the surface of the recording medium. The electrostatic charge image developer of the exemplary embodiment is employed as the electrostatic charge image developer.

The image forming apparatus of the exemplary embodiment is used to implement an image forming method (the image forming method of the exemplary embodiment) that involves a charging step of charging a surface of an image bearing member, an electrostatic charge image forming step of forming an electrostatic charge image on the charged surface of the image bearing member, a developing step of developing the electrostatic charge image on the surface of the image bearing member into a toner image by using the electrostatic charge image developer of the exemplary embodiment, a transfer step of transferring the toner image on the surface of the image bearing member onto a surface of a recording medium, and a fixing step of fixing the transferred toner image on the surface of the recording medium.

The image forming apparatus of the exemplary embodiment may be, for example, a known image forming apparatus such as a direct transfer type apparatus with which a toner image formed on a surface of an image bearing member is directly transferred onto a recording medium; an intermediate transfer type apparatus with which a toner image formed on a surface of an image bearing member is first transferred onto a surface of an intermediate transfer body and then the toner image on the intermediate transfer body is transferred for the second time onto a surface of a recording medium; an apparatus equipped with a cleaning unit that cleans the surface of an image bearing member after the transfer of the toner image and before charging; or an apparatus equipped with a charge erasing unit that irradiates the surface of an image bearing member with charge erasing light to remove charges after the transfer of the toner image and before charging.

When the intermediate transfer type apparatus is used, the transfer unit has a structure that includes an intermediate transfer body having a surface that receives the transfer of a toner image, a first transfer unit that performs first transfer of transferring the toner image on the surface of the image bearing member onto a surface of the intermediate transfer body, and a second transfer unit that performs second transfer of transferring the transferred toner image on the surface of the intermediate transfer body onto a surface of a recording medium.

In the image forming apparatus of the exemplary embodiment, for example, a portion that includes the developing unit may have a cartridge structure (process cartridge) detachably attachable to the image forming apparatus. An example of the process cartridge is a process cartridge equipped with a developing unit that stores the electrostatic charge image developer of the exemplary embodiment.

Hereinafter, one example of the image forming apparatus of the exemplary embodiment is described, but this exemplary embodiment is not limiting. Only the relevant parts in the drawing are described, and descriptions for other parts are omitted.

FIG. 1 is a schematic diagram illustrating an image forming apparatus according to an exemplary embodiment.

An image forming apparatus illustrated in FIG. 1 is equipped with electrophotographic first to fourth image forming units 10Y, 10M, 10C, and 10K (image forming units) that output images of respective colors, yellow (Y), magenta (M), cyan (C), and black (K), on the basis of the color separated image data. These image forming units (hereinafter may be simply referred to as "units") 10Y, 10M, 10C, and 10K are spaced from one another by predetermined distances in the horizontal direction and arranged side-by-side. The units 10Y, 10M, 10C, and 10K may be process cartridges detachably attachable to the image forming apparatus.

An intermediate transfer belt 20 serving as an intermediate transfer body extends above all of the units 10Y, 10M, 10C, and 10K in the drawing. The intermediate transfer belt 20 is wound around a driving roll 22 and a supporting roll 24 arranged to be spaced from each other in the left-to-right direction in the drawing, and runs in the direction from the first unit 10Y toward the fourth unit 10K. The supporting roll 24 is in contact with the inner surface of the intermediate transfer belt 20 and is urged to be away from the driving roll 22 by a spring or the like not illustrated in the drawing so that a tension is applied to the intermediate transfer belt 20 wound around the two rolls. An intermediate transfer body cleaning device 30 that opposes the driving roll 22 is disposed on the image-bearing-member-side surface of the intermediate transfer belt 20.

In addition, toners of four colors, yellow, magenta, cyan, and black, are supplied from toner cartridges 8Y, 8M, 8C, and 8K to developing devices (developing units) 4Y, 4M, 4C, and 4K of the units 10Y, 10M, 10C, and 10K.

Since the first to fourth units 10Y, 10M, 10C, and 10K are identical in structure, the first unit 10Y that is disposed on the upstream side in the intermediate transfer belt running direction and forms a yellow image is described as a representative example. The parts equivalent to those of the first unit 10Y are represented by the same reference sign followed by magenta (M), cyan (C), or black (K) instead of yellow (Y), and descriptions of the second to fourth units 10M, 10C, and 10K are omitted.

The first unit 10Y includes a photoreceptor 1Y that serves as an image bearing member. The photoreceptor 1Y are surrounded by, in order of arrangement, a charging roll (one example of the charging unit) 2Y that charges a surface of the photoreceptor 1Y to a predetermined potential, an exposing device (one example of the electrostatic charge image forming unit) 3 that exposes the charged surface of the photoreceptor 1Y with a laser beam 3Y on the basis of the color-separated image signal so as to form an electrostatic charge image, a developing device (one example of the developing unit) 4Y that develops the electrostatic charge image by supplying a charged toner to the electrostatic charge image, a first transfer roll (one example of the first transfer unit) 5Y that transfers the developed toner image onto the intermediate transfer belt 20, and a cleaning device (one example of the cleaning unit) 6Y that removes the toner remaining on the surface of the photoreceptor 1Y after the first transfer.

The first transfer roll 5Y is disposed on the inner side of the intermediate transfer belt 20 and positioned to oppose the photoreceptor 1Y. Furthermore, bias power supplies (not illustrated) that apply first transfer biases are respectively connected to the first transfer rolls 5Y, 5M, 5C, and 5K. A controller not illustrated in the drawing controls each of the bias power supplies so that the transfer bias applied to the first transfer roll is variable.

Hereinafter, operation of forming a yellow image in the first unit 10Y is described.

First, before starting operation, the surface of the photoreceptor 1Y is charged by the charging roll 2Y to a potential in the range of −600 V to −800 V.

The photoreceptor 1Y is formed by stacking a photosensitive layer on a conductive (for example, volume resistivity at 20° C.: $1\times10^{-6}$ Ωcm or less) base. This photosensitive layer normally has a high resistance (a resistance of a general resin); however, once irradiated with a laser beam 3Y, the portion exposed to the laser beam exhibits a change in resistivity. Next, the charged surface of the photoreceptor 1Y is irradiated with a laser beam 3Y emitted from the exposing device 3 on the basis of the yellow image data transmitted from a controller not illustrated in the drawings. The photosensitive layer constituting the surface of the photoreceptor 1Y is irradiated with the laser beam 3Y, and an electrostatic charge image having a yellow image pattern is thereby formed on the surface of the photoreceptor 1Y.

An electrostatic charge image is an image formed on the surface of the photoreceptor 1Y as a result of charging, and is a negative latent image formed as the decrease in the resistivity of the portion of the photosensitive layer irradiated with the laser beam 3Y causes the charges to flow out from the surface of the photoreceptor 1Y while the charges in the portions not irradiated with the laser beam 3Y remain.

The electrostatic charge image formed on the photoreceptor 1Y is rotated to a predetermined developing position as the photoreceptor 1Y is run. At that developing position, the electrostatic charge image on the photoreceptor 1Y is visualized by the developing device 4Y into a toner image (developed image).

The developing device 4Y stores an electrostatic charge image developer that contains at least a yellow toner and a carrier. The yellow toner is frictionally charged by being stirred in the developing device 4Y, and is held on the developer roll (one example of the developer carrying member) while the yellow toner has charges of the same polarity (negative polarity) as the charges on the photoreceptor 1Y. As the surface of the photoreceptor 1Y passes the developing device 4Y, the yellow toner electrostatically adheres to the latent image portion from which the charges on the surface of the photoreceptor 1Y have been removed, and the latent image is developed with the yellow toner. The photoreceptor 1Y on which the yellow toner image is formed is continuously run at a predetermined speed, and the developed toner image on the photoreceptor 1Y is conveyed to a predetermined first transfer position.

Once the yellow toner image on the photoreceptor 1Y is conveyed to the first transfer position, a first transfer bias is applied to the first transfer roll 5Y, an electrostatic force acting from the photoreceptor 1Y toward the first transfer roll 5Y acts on the toner image, and the toner image on the photoreceptor 1Y is transferred onto the intermediate transfer belt 20. The transfer bias applied here has a polarity (+) opposite to the polarity (−) of the toner, and, in the first unit 10Y, for example, is controlled at +10 μA by a controller (not illustrated).

Meanwhile, the toner remaining on the photoreceptor 1Y is removed by the photoreceptor cleaning device 6Y and recovered.

The first transfer biases applied to the first transfer rolls 5M, 5C, and 5K of the second unit 10M and onwards are also controlled as with the first unit.

The intermediate transfer belt 20, onto which a yellow toner image is transferred in the first unit 10Y, sequentially passes the second to fourth units 10M, 10C, and 10K, and toner images of respective colors are stacked on top of each other to perform multilayer transfer.

After the multilayer transfer of toner images of four colors through the first to fourth units, the intermediate transfer belt 20 reaches a second transfer portion constituted by the intermediate transfer belt 20, the supporting roll 24 in contact with the inner surface of the intermediate transfer belt 20, and a second transfer roll (one example of the second transfer unit) 26 disposed on the image-retaining-surface-side of the intermediate transfer belt 20. Meanwhile, a recording sheet (one example of the recording medium) P is fed, via a feeder mechanism, to a contact gap between the second transfer roll 26 and the intermediate transfer belt 20 at a predetermined timing, and a second transfer bias is applied to the supporting roll 24. The transfer bias applied here has the same polarity (−) as the polarity o(−) of the toner, an electrostatic force from the intermediate transfer belt 20 acting toward the recording sheet P acts on the toner images, and the toner images on the intermediate transfer belt 20 are transferred onto the recording sheet P. Here, the second transfer bias is determined according to the resistance of the second transfer portion detected by a resistance detection unit (not illustrated), and is controlled by voltage.

Subsequently, the recording sheet P is conveyed to a contact portion (nip portion) of a pair of fixing rolls in a fixing device (one example of the fixing unit) 28 where the toner images are fixed to the recording sheet P and a fixed image is formed.

Examples of the recording sheet P onto which the toner images are transferred include regular paper used in electrophotographic copiers and printers. Examples of the recording medium also include OHP sheets and the like in addition of the recording sheet P.

In order to further improve the smoothness of the image surface after fixing, the surface of the recording sheet P may be smooth. For example, coated paper obtained by coating the surface of regular paper with a resin or the like, art paper for printing, and the like may be used.

After completion of fixing of the color image, the recording sheet P is conveyed toward a discharge portion, and a series of color image forming operation steps are completed.

Process cartridge and toner cartridge A process cartridge according to an exemplary embodiment will now be described.

The process cartridge according to this exemplary embodiment is detachably attachable to an image forming apparatus, and includes a developing unit that stores the electrostatic charge image developer of the exemplary embodiment and develops an electrostatic charge image on a surface of an image bearing member into a toner image by using the electrostatic charge image developer.

The process cartridge of the exemplary embodiment is not limited to the aforementioned structure, and may include a developing device and, if needed, at least one unit selected from an image bearing member, a charging unit, an electrostatic charge image forming unit, transfer unit, and other units, for example.

Hereinafter, one example of the process cartridge of the exemplary embodiment is described, but this example is not limiting. Only the relevant parts in the drawing are described, and descriptions for other parts are omitted.

Figure 2:
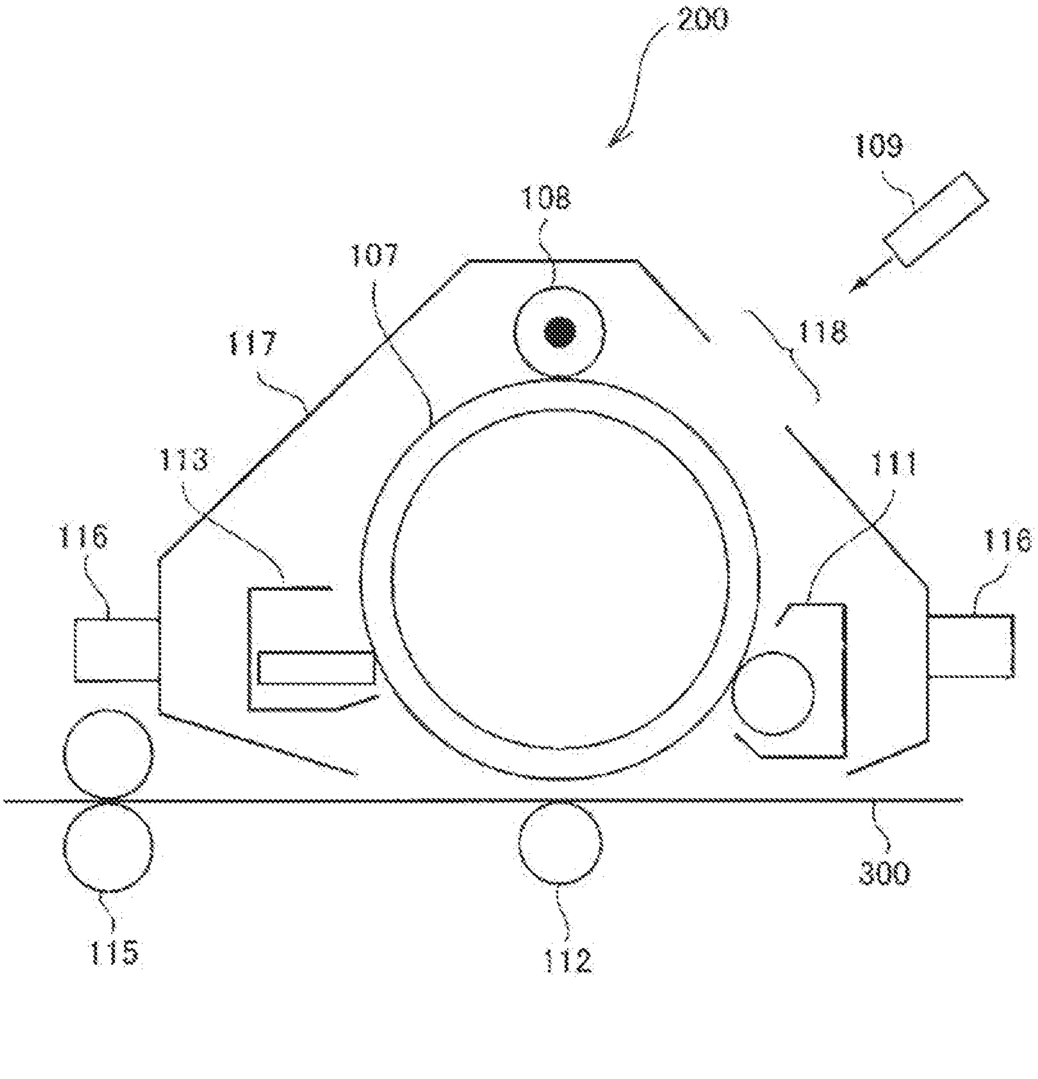
FIG. 2 is a schematic diagram illustrating one example of a process cartridge according to an exemplary embodiment.

FIG. 2 is a schematic diagram illustrating a process cartridge according to an exemplary embodiment.

A process cartridge 200 illustrated in FIG. 2 is, for example, a cartridge obtained by using a housing 117 equipped with a guide rail 116 and an exposure opening 118 so as to integrate a photoreceptor 107 (one example of the image bearing member), and a charging roll 108 (one example of the charging unit), a developing device 111 (one example of the developing unit), and a photoreceptor cleaning device 113 (one example of the cleaning unit) provided around the photoreceptor 107.

In FIG. 2, 109 denotes an exposure device (one example of the electrostatic charge image forming unit), 112 denotes a transfer device (one example of the transfer unit), 115 denotes a fixing device (one example of the fixing unit), and 300 denotes a recording sheet (one example of the recording medium).

Next, a toner cartridge according to an exemplary embodiment is described.

The toner cartridge according to this exemplary embodiment stores the toner of the exemplary embodiment and is detachably attachable to an image forming apparatus. The toner cartridge stores replenishing toner to be supplied to a developing unit disposed inside the image forming apparatus.

Note that the image forming apparatus illustrated in FIG. 1 has detachably attachable toner cartridges 8Y, 8M, 8C, and 8K that are respectively connected to the developing devices 4Y, 4M, 4C, and 4K of the corresponding colors via toner supply tubes not illustrated in the drawing. In addition, when the toner level in the toner cartridge has run low, the cartridge is replaced.

EXAMPLES

Hereinafter, the exemplary embodiments are specifically described in further details through examples and comparative examples but are not limited by these examples in any way. In the description below, "parts" and "%" are on a mass basis unless otherwise noted.

Preparation of Styrene Acrylic Resin Particle Dispersion (S1)

styrene: 3,750 parts
n-butyl acrylate: 250 parts
acrylic acid: 20 parts
dodecanethiol: 240 parts
carbon tetrabromide: 40 parts In a reaction vessel, a mixture prepared by mixing and dissolving the aforementioned materials is dispersed and emulsified with a surfactant solution prepared by dissolving 60 parts of a nonionic surfactant (NONIPOL 400 produced by Sanyo Chemical Industries Ltd.) and 100 parts of an anionic surfactant (TaycaPower produced by TAYCA Co., Ltd.) in 5,500 parts of ion exchange water. Next, while the inside of the reaction vessel is stirred, an aqueous solution prepared by dissolving 40 parts of aluminum persulfate in 500 parts of ion exchange water is added over a period of 20 minutes. Next, after nitrogen purging, while the inside of the reaction vessel is stirred, the content thereof is heated until 70° C., and the temperature of 70° C. is retained for 5 hours to continue emulsification polymerization. Thus, a resin particle dispersion containing dispersed resin particles having a volume average particle diameter of 160 nm is obtained. To this resin particle dispersion, ion exchange water is added to adjust the solid content to 20%, and as a result, a styrene acrylic resin particle dispersion (S1) is obtained.

The weight-average molecular weight of the resin particles in the styrene acrylic resin particle dispersion (S1) is 35,000, and the glass transition temperature Tg is 63° C.

Synthesis of Amorphous Polyester Resin (A)

terephthalic acid: 690 parts
fumaric acid: 310 parts ethylene glycol: 400 parts 1,5-pentandeiol: 450 parts The aforementioned materials are placed in a reaction vessel equipped with a stirrer, a nitrogen inlet tube, a temperature sensor, and a distillation column, the temperature is elevated to 220° C. over a period of 1 hour under nitrogen gas stream, and 10 parts of titanium tetraethoxide is added to a total of 1,000 parts of the aforementioned materials. The temperature is elevated to 240° C. over a period of 0.5 hours while distilling away the generated water, dehydration and condensation reaction is continued for 1 hour at 240° C., and then the reaction product is cooled. As a result, an amorphous polyester resin (A) having a weight-average molecular weight of 96,000 and a glass transition temperature of 59° C. is obtained.

Preparation of Amorphous Polyester Resin Particle Dispersion (A1)

Into a vessel equipped with a temperature adjusting unit and a nitrogen purging unit, 550 parts of ethyl acetate and 250 parts of 2-butanol are placed to prepare a mixed solvent, and then 1,000 parts of the amorphous polyester resin (A) is gradually added thereto to be dissolved. Thereto, a 10% aqueous ammonia solution (amount equivalent to a molar ratio of 3 relative to the acid value of the resin) is added, and the resulting mixture is stirred for 30 minutes. Next, the inside of the container is substituted with dry nitrogen, the temperature is retained at 40° C., and 4,000 parts of ion exchange water is added dropwise while stirring the mixed solution so as to conduct emulsification. Upon completion of the dropwise addition, the emulsion is returned to 25° C., the solvent is removed at a reduced pressure, and, as a result, a resin particle dispersion containing dispersed resin particles having a volume average particle diameter of 160 nm is obtained. To this resin particle dispersion, ion exchange water is added to adjust the solid content to 20 mass % so as to obtain an amorphous polyester resin particle dispersion (A1).

Preparation of Crystalline Polyester Resin Particle Dispersion (D1)

1,10-decanedicarboxylic acid: 2,600 parts 1,6-hexanediol: 1,670 parts dibutyl tin oxide (catalyst): 3 parts The aforementioned materials are placed in a heated and dried reaction vessel, the air inside the reaction vessel is purged with nitrogen gas to create an inert atmosphere, and the resulting mixture is mechanically stirred and refluxed at 180° C. for 5 hours. Next, the temperature is gradually elevated to 230° C. at a reduced pressure, stirring is continued for 2 hours, and the mixture is air-cooled after the mixture has turned viscous to terminate the reaction. As a result, a crystalline polyester resin having a weight-average molecular weight of 12,600 and a melting temperature of 73° C. is obtained.

900 parts of the crystalline polyester resin, 18 parts of an anionic surfactant (TaycaPower produced by TAYCA Co., Ltd.), and 2,100 parts of ion exchange water are mixed, and the resulting mixture is heated to 120° C., dispersed with a homogenizer (ULTRA-TURRAX T50 produced by IKA Japan), and then dispersed with a pressure discharge Gaulin homogenizer for 1 hour. As a result, a resin particle dispersion in which resin particles having a volume average particle diameter of 160 nm are dispersed is obtained. To this resin particle dispersion, ion exchange water is added to adjust the solid content to 20 mass % so as to obtain a crystalline polyester resin particle dispersion (D1).

Preparation of Releasing Agent Particle Dispersion (W1)

ester wax (product name: WEP-9 produced by NOF CORPORATION, melting temperature: 67° C.): 1,000 parts anionic surfactant (TaycaPower produced by TAYCA Co., Ltd.): 10 parts ion exchange water: 3,500 parts The aforementioned materials are mixed. The resulting mixture is heated to 100° C., dispersed with a homogenizer (ULTRA-TURRAX T50 produced by IKA Japan), and then dispersed with a pressure discharge Gaulin homogenizer. As a result, a releasing agent particle dispersion in which releasing agent particles having a volume average particle diameter of 220 nm are dispersed is obtained. To this releasing agent particle dispersion, ion exchange water is added to adjust the solid content to 20 mass % so as to obtain a releasing agent particle dispersion (W1).

Preparation of Releasing Agent Particle Dispersion (W2)

Fischer-Tropsch wax (FNP92 produced by HNP-9 produced by Nippon Seiro Co., Ltd., melting temperature: 92° C.): 1,000 parts anionic surfactant (TaycaPower produced by TAYCA Co., Ltd.): 10 parts ion exchange water: 3,500 parts The aforementioned materials are mixed. The resulting mixture is heated to 100° C., dispersed with a homogenizer (ULTRA-TURRAX T50 produced by IKA Japan), and then dispersed with a pressure discharge Gaulin homogenizer. As a result, a releasing agent particle dispersion in which releasing agent particles having a volume average particle diameter of 220 nm are dispersed is obtained. To this releasing agent particle dispersion, ion exchange water is added to adjust the solid content to 20 mass % so as to obtain a releasing agent particle dispersion (W2).

Preparation of Coloring Agent Particle Dispersion (K1)

carbon black (Regal 330 produced by Cabot Corporation): 500 parts ionic surfactant NEOGEN RK (produced by DKS Co., Ltd.): 50 parts ion exchange water: 1,930 parts The aforementioned materials are mixed. The resulting mixture is treated with Altimizer (produced by SUGINO MACHINE LIMITED) at 240 MPa for 10 minutes. As a result, a coloring agent particle dispersion (K1) (solid concentration: 20 mass %) in which coloring agent particles having a volume average particle diameter of 140 nm are dispersed is prepared.

Example 1

Preparation of Toner Particles styrene acrylic resin particle dispersion (S1): 50 parts amorphous polyester resin particle dispersion (A1): 245 parts crystalline polyester resin particle dispersion (D1): 75 parts coloring agent particle dispersion (K1): 40 parts anionic surfactant (TaycaPower produced by TAYCA Co., Ltd.), a 20 mass % aqueous solution: 10 parts ion exchange water: 215 parts The aforementioned components are placed in a 3 L reactor equipped with a thermometer, a pH meter, and a stirrer, and the resulting mixture is retained for 30 minutes at a temperature of 30° C. at a stirring rotational rate of 150 rpm while the temperature is controlled from outside by using a heating mantle. As a result, a mixed dispersion containing core resin particles and coloring agent particles is obtained (dispersion preparation step).

Subsequently, a 0.3 N aqueous nitric acid solution is added to the mixed dispersion, and the pH is adjusted to 3.0 in the aggregated particle forming step. To the mixed dispersion, an aqueous PAC solution, which is prepared by dissolving 0.7 parts of PAC (polyaluminum chloride produced by Oji Paper Co., Ltd., 30 mass % powder product) in 7 parts of ion exchange water, is added while dispersing in a homogenizer (ULTRA-TURRAX T50 produced by IKA Japan). Subsequently, the temperature is elevated to 50° C. under stirring, and the particle diameter is measured with Coulter Multisizer II (produced by Beckman Coulter Inc., aperture diameter: 50 μm). As a result, a dispersion containing core aggregated particles having a volume average particle diameter of 4.5 μm is obtained (first aggregated particle forming step).

Next, a mixture of 100 parts of the amorphous polyester resin particle dispersion (A1) having a pH adjusted to 4.0 and 40 parts of the releasing agent particle dispersion (W1) is further added to the dispersion containing the core aggregated particles, and the resulting mixture is retained for 30 minutes. Furthermore, 45 parts of the amorphous polyester resin particle dispersion (A1) having a pH adjusted to 4.0 is added to the resulting dispersion. As a result, a dispersion containing core-shell aggregated particles having a volume average particle diameter of 5.0 μm is obtained (second aggregated particle forming step).

Next, 20 parts of a 10 mass % NTA (nitrilotriacetic acid) metal salt aqueous solution (chelating agent, Chelest 70 produced by Chelest Corporation) is added to the dispersion containing core-shell aggregated particles, and the pH is then adjusted to 9.0 by using a 1 N aqueous sodium hydroxide solution. As a result, a dispersion containing aggregated particles in which aggregation of the resin particles has been terminated is obtained (pH adjusting step).

Next, to the dispersion containing aggregated particles in which aggregation of the resin particles has been terminated, 2.5 parts of a 20 mass % aqueous sodium alkylbenzene sulfonate solution (anionic surfactant, number of carbon atoms in the alkyl group: 12) is added at a rate of 0.2 parts by mass/minute within 2 minutes from adjusting the pH to 9.0 (surfactant adding step).

The amount of the anionic surfactant added relative to 100 parts by mass of the aggregated particles (in Table 1, "Amount added relative to particles (parts by mass)"), the amount of the anionic surfactant added relative to 100 parts by mass of the chelating agent (in Table 1, "amount added relative to chelating agent (parts by mass)"), and the addition rate of the anionic surfactant relative to 100 parts by mass of the aggregated particles (in Table 1, "Addition rate (parts by mass/minute)") are indicated in Table 1. The same applies to the following examples and comparative examples.

Subsequently, the temperature (in other words, the coalescence temperature) of the dispersion containing the aggregated particles is elevated to 80° C. over a period of 90 minutes (temperature elevation time), the dispersion is retained thereat for 90 minutes (coalescing time), then cooled to 30° C. over a period of 30 minutes (cooling time), and filtered to obtain crude toner particles. The crude toner particles are washed with 30° C. ion exchange water to remove impurities in the crude toner particles, and vacuum-dried for 7 hours in an oven controlled at 30° C. As a result, toner particles (K1) are obtained (toner particle forming step).

The total amount of the PAC added relative to the total amount of the obtained toner particles is 0.7 mass %, and the amount of the chelating agent added relative to a total of 100 parts by mass of the PAC is 2.0 parts by mass.

The volume average particle diameter (D50v) of the obtained toner particles measured by the aforementioned method is 5.0 μm.

The large-diameter-side volume particle size distribution index (oversize GSDv) of the obtained toner particles measured by the aforementioned method is indicated in Table 2 (in Table 2, "Oversize GSDv"). Whether the region that extends to a depth of 200 μm or less from the surface contains a releasing agent in the obtained toner particles is determined by the aforementioned method, and the results are indicated in Table 2 (in Table 2, "Presence/absence of releasing agent on surfaces"). The same applies to the following examples and comparative examples.

The thickness of the outermost layer of the shell layer of the toner particles is measured by the aforementioned method, and is 70 μm.

External Addition of External Additive

In a sample mill, 100 parts of the toner articles (K1) and 1.5 parts of hydrophobic silica (RY50 produced by NIPPON AEROSIL CO., LTD.) are mixed, and the resulting mixture is mixed for 30 seconds at a rotation rate of 10,000 rpm. The resulting mixture is screened through a vibrating sieve having a screen opening of 45 μm to obtain a toner (K1) (electrostatic charge image developing toner).

Preparation of Carrier

After 500 parts of spherical magnetite powder particles (volume average particle diameter: 0.55 μm) are thoroughly stirred in a HENSCHEL mixer, 5 parts of a titanate coupling agent is added, and the resulting mixture is heated to 100° C. and then stirred for 30 minutes. Next, into a four-necked flask, 6.25 parts of phenol, 9.25 parts of 35 mass % formalin, 500 parts of the magnetite particles treated with the titanate coupling agent, 6.25 parts of 25 mass % ammonia water, and 425 parts of water are placed, and the resulting mixture is stirred and reacted at 85° C. for 120 minutes while stirring. Next, after cooling to 25° C., 500 parts of water is added thereto, the supernatant is removed, and the deposits are washed with water. The washed deposits are dried by heating at a reduced pressure so as to obtain a carrier (CA) having an average particle diameter of 35 μm.

Mixing Toner and Carrier

The toner (K1) and the carrier (CA) are placed in a V blender at toner (K1):carrier (CA)=5:95 (mass ratio), and the resulting mixture is stirred for 20 minutes. As a result, a developer (K1) (electrostatic charge image developer) is obtained.

Evaluation

Evaluation of Color Omission

The obtained developer is loaded into a developing device of a modified model of ApeosPort-V C5585 (produced by FUJIFILM Business Innovation Corp.) at a temperature of 28° C. and a humidity of 85%. An image including a rectangular patch is formed at an image density of 5% on a sheet of embossed paper (LEATHAC 66 produced by Tokushu Tokai Paper Co., Ltd., 203 gsm), and then the image quality (checking whether there is color omission) is evaluated. The obtained image is visually confirmed, and the presence/absence of color omission is evaluated by the following standard. The rating of G3 or higher is the acceptable range. The results are indicated in Table 2.

Evaluation Standard for Presence/Absence of Color Omission

G1: No color omission is found in recessed portions of the embossed paper.

G2: Color omission is found in recessed portions of the embossed paper in the image area range of 3% or less.

G3: Color omission is found in recessed portions of the embossed paper in the image area range larger than 3% but not larger than 10%.

G4: Color omission is found in recessed portions of the embossed paper in an image area range larger than 10%.

Density Variation Evaluation

The obtained developer is loaded into a developing device of a modified model of ApeosPort-V C5585 (produced by FUJIFILM Business Innovation Corp.) at a temperature of 28° C. and a humidity of 85%. An image including a rectangular patch is formed at an image density of 90% on a sheet of embossed paper (LEATHAC 66 produced by Tokushu Tokai Paper Co., Ltd., 203 gsm), and then the image quality (checking whether there is density variation) is evaluated. The density of the image formed in the recessed portions of the embossed paper are measured with image densitomer X-Rite 938 (produced by X-Rite Inc.) at ten points randomly selected, and the image density difference between the maximum value and the minimum value is determined. The image density variation is evaluated according to the following standard. The rating of G3 or higher is the acceptable range. The results are indicated in Table 2.

Standard for Evaluating Presence/Absence of Density Variation

G1: The image density difference is 2% or less.

G2: The image density difference is larger than 2% but not larger than 3%.

G3: The image density difference is larger than 3% but not larger than 5%.

G4: The image density difference is larger than 5%.

Example 2

A developer is obtained as in Example 1 except that, in the dispersion preparation step, 40 parts of the releasing agent particle dispersion (W1) is additionally used to obtain a mixed dispersion containing core resin particles, coloring agent particles, and releasing agent particles, and, in the second aggregated particle forming step, the releasing agent particle dispersion (W1) is not used. Subsequently, the developer is evaluated as in Example 1.

Example 3

A developer is obtained as in Example 1 except that, in the second aggregated particle forming step, the releasing agent particle dispersion (W2) is used instead of the releasing agent particle dispersion (W1). Subsequently, the developer is evaluated as in Example 1.

Example 4

A developer is obtained as in Example 1 except that, in the surfactant adding step, 2.5 parts of a 20 mass % aqueous sodium octylbenzene sulfonate solution (anionic surfactant, number of carbon atoms in the alkyl group: 8) is used as the anionic surfactant aqueous solution instead of the 20 mass % aqueous sodium alkylbenzene sulfonate solution (anionic surfactant, number of carbon atoms in the alkyl group: 12). Subsequently, the developer is evaluated as in Example 1.

Example 5

A developer is obtained as in Example 1 except that, in the surfactant adding step, 2.5 parts of a 20 mass % aqueous sodium hexadecane sulfonate solution (anionic surfactant, number of carbon atoms in the alkyl group: 16) is used as the anionic surfactant aqueous solution instead of the 20 mass % aqueous sodium alkylbenzene sulfonate solution (anionic surfactant, number of carbon atoms in the alkyl group: 12). Subsequently, the developer is evaluated as in Example 1.

Example 6

A developer is obtained as in Example 1 except that, in the surfactant adding step, 2.5 parts of a 20 mass % aqueous sodium dodecyl sulfate solution (anionic surfactant, number of carbon atoms in the alkyl group: 12) is used as the anionic surfactant aqueous solution instead of the 20 mass % aqueous sodium alkylbenzene sulfonate solution (anionic surfactant, number of carbon atoms in the alkyl group: 12). Subsequently, the developer is evaluated as in Example 1.

Examples 7 to 9

A developer is obtained as in Example 1 except that, in the surfactant adding step, the amount of the anionic surfactant aqueous solution added is changed so that the amount of the anionic surfactant relative to 100 parts by mass of the aggregated particles and the amount of the anionic surfactant added relative to 100 parts by mass of the chelating agent added are as indicated in Table 1. Subsequently, the developer is evaluated as in Example 1.

Example 10

A developer is obtained as in Example 1 except that, in the surfactant adding step, the addition rate of the anionic surfactant aqueous solution is changed as indicated in Table 1. Subsequently, the developer is evaluated as in Example 1.

Example 11

A developer is obtained as in Example 1 except that, in the surfactant adding step, the concentration of the anionic surfactant aqueous solution is changed to 12 mass %. Subsequently, the developer is evaluated as in Example 1.

Example 12

A developer is obtained as in Example 1 except that, in the pH adjusting step, the chelating agent is not added. Subsequently, the developer is evaluated as in Example 1.

Example 13

A developer is obtained as in Example 1 except that, in the first aggregated particle forming step, 8.2 parts of a 10 mass % aqueous solution of ammonium sulfate (AS) is added instead of the aqueous PAC solution and that the chelating agent is not added in the pH adjusting step. Subsequently, the developer is evaluated as in Example 1.

Example 14

A developer is obtained as in Example 1 except that, in the pH adjusting step, the pH is adjusted to 7.5 by using a 1 N aqueous sodium hydroxide solution instead of adjusting the pH to 9.0 by using a 1 N aqueous sodium hydroxide solution. Subsequently, the developer is evaluated as in Example 1.

Comparative Example 1

A developer is obtained as in Example 1 except that, in the surfactant adding step, the aqueous sodium alkylbenzene sulfonate solution is not added to the dispersion containing aggregated particles in which aggregation of the resin particles has been terminated. Subsequently, the developer is evaluated as in Example 1.

Comparative Example 2

A developer is obtained as in Example 1 except that, in the pH adjusting step, instead of the chelating agent, 2.5 parts of a 20 mass % aqueous sodium alkylbenzene sulfonate solution (anionic surfactant, number of carbon atoms in the alkyl group: 12) is added at an addition rate of 0.2 parts by mass/minute to the dispersion containing the core-shell aggregated particles and that, in the surfactant adding step, the aqueous sodium alkylbenzene sulfonate solution is not added to the dispersion containing aggregated particles in which aggregation of the resin particles has been terminated. Subsequently, the developer is evaluated as in Example 1.

TABLE 1

| | Releasing agent | | | | | Surfactant | | | | | |
|---|---|---|---|---|---|---|---|---|---|---|---|
| | Type | Melting temperature (° C.) | Aggregating agent Type | Chelating agent Type | pH at addition | Type | Number of carbon atoms | Aqueous solution concentration (mass%) | Amount added relative to particles (parts by mass) | Amount added relative to chelating agent (parts by mass) | Addition rate (parts by mass/minute) |
| Example 1 | W1 | 67 | PAC | NTA | 9.0 | LAS | 12 | 20 | 0.5 | 25 | 0.2 |
| Example 2 | W1 | 67 | PAC | NTA | 9.0 | LAS | 12 | 12 | 0.5 | 25 | 0.2 |
| Example 3 | W2 | 92 | PAC | NTA | 9.0 | LAS | 12 | 12 | 0.5 | 25 | 0.2 |
| Example 4 | W1 | 67 | PAC | NTA | 9.0 | O-LAS | 12 | 12 | 0.5 | 25 | 0.2 |
| Example 5 | W1 | 67 | PAC | NTA | 9.0 | H-SAS | 12 | 12 | 0.5 | 25 | 0.2 |
| Example 6 | W1 | 67 | PAC | NTA | 9.0 | SLS | 12 | 12 | 0.5 | 25 | 0.2 |
| Example 7 | W1 | 67 | PAC | NTA | 9.0 | LAS | 12 | 20 | 0.016 | 8 | 0.2 |
| Example 8 | W1 | 67 | PAC | NTA | 9.0 | LAS | 12 | 20 | 1.4 | 70 | 0.2 |
| Example 9 | W1 | 67 | PAC | NTA | 9.0 | LAS | 12 | 20 | 2.4 | 120 | 0.2 |
| Example 10 | W1 | 67 | PAC | NTA | 9.0 | LAS | 12 | 20 | 0.5 | 25 | 2.5 |
| Example 11 | W1 | 67 | PAC | NTA | 9.0 | LAS | 12 | 30 | 0.5 | 25 | 0.2 |
| Example 12 | W1 | 67 | PAC | — | 9.0 | LAS | 12 | 20 | 0.5 | — | 0.2 |
| Example 13 | W1 | 67 | AS | NTA | 9.0 | LAS | 12 | 20 | 0.5 | — | 0.2 |
| Example 14 | W1 | 67 | PAC | NTA | 7.5 | LAS | 12 | 20 | 0.5 | 25 | 0.2 |
| Comparative Example 1 | W1 | 67 | PAC | NTA | — | — | — | — | — | — | — |
| Comparative Example 2 | W1 | 67 | PAC | — | 3.2 | LAS | 12 | 20 | 0.5 | — | 0.2 |

TABLE 2

| | Toner | | Evaluation | |
|---|---|---|---|---|
| | Oversize GSDv | Presence/absence of releasing agent on surfaces | Color omission | Density variation |
| Example 1 | 1.21 | Present | G1 | G1 |
| Example 2 | 1.21 | Absent | G1 | G1 |
| Example 3 | 1.20 | Present | G1 | G1 |
| Example 4 | 1.22 | Present | G2 | G1 |
| Example 5 | 1.21 | Present | G1 | G2 |
| Example 6 | 1.22 | Present | G2 | G2 |
| Example 7 | 1.23 | Present | G3 | G1 |
| Example 8 | 1.21 | Present | G1 | G2 |
| Example 9 | 1.21 | Present | G1 | G3 |
| Example 10 | 1.22 | Present | G1 | G1 |

TABLE 2-continued

| | Toner | | Evaluation | |
|---|---|---|---|---|
| | Oversize GSDv | Presence/absence of releasing agent on surfaces | Color omission | Density variation |
| Example 11 | 1.22 | Present | G1 | G1 |
| Example 12 | 1.23 | Present | G3 | G3 |
| Example 13 | 1.22 | Present | G2 | G3 |
| Example 14 | 1.23 | Present | G3 | G2 |
| Comparative Example 1 | 1.27 | Present | G4 | G4 |
| Comparative Example 2 | 1.25 | Present | G4 | G3 |

In Table 1, PAC represents an aqueous polyaluminum chloride solution, AS represents an aqueous ammonium sulfate solution, NTA represents an aqueous nitrilotriacetate metal salt solution, LAS represents sodium alkylbenzene sulfonate, O-LAS represents sodium octylbenzene sulfonate, H-SAS represents sodium hexadecane sulfonate, and SLS represents sodium dodecylsulfate.

The results above indicate that toners for developing electrostatic charge images obtained in Examples experience less color omission in the obtained images compared to the comparative examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a toner for developing an electrostatic charge image, the method comprising:

preparing a dispersion that comprises first resin particles comprising a physical mixture of amorphous resin particles and crystalline resin particles;

forming first aggregated particles at a pH of less than 7.0 by adding an aggregating agent to the dispersion so as to aggregate the first resin particles;

forming second aggregated particles by adding second resin particles comprising amorphous resin particles containing a polycondensation resin to the dispersion that has undergone the forming of the first aggregated particles so as to aggregate the second resin particles onto the first aggregated particles;

adjusting a pH of the dispersion that has undergone the forming of the second aggregated particles to 7.0 or more so as to prepare a dispersion of aggregated particles in which aggregation of the resin particles has been terminated;

adding an anionic surfactant to the dispersion of aggregated particles in which aggregation of the resin particles has been terminated and having a pH adjusted to 7.0 or more; and forming core-shell toner particles by heating the dispersion comprising the anionic surfactant so as to fuse and coalesce the aggregated particles in which aggregation of the resin particles has been terminated, wherein releasing agent particles are added to the dispersion during the preparing of the dispersion or during the forming of the second aggregated particles, or during both the preparing of the dispersion and the forming of the second aggregated particles.

2. The method according to claim 1, wherein the aggregating agent is an inorganic metal salt.

3. The method according to claim 2, wherein, in the adjusting of the pH, a chelating agent is added to the dispersion.

4. The method according to claim 3, wherein, in the adding of the anionic surfactant, an amount of the anionic surfactant added relative to 100 parts by mass of the chelating agent added during the adjusting of the pH is 1 part by mass or more and 100 parts by mass or less.

5. The method according to claim 1, wherein, in the forming of the second aggregated particles, the releasing agent particles are added to the dispersion.

6. The method according to claim 5, wherein the toner particles formed in the forming of the toner particles each contain a releasing agent in a region that extends to a depth of 200 μm or less from a surface.

7. The method according to claim 1, wherein the releasing agent particles have a melting temperature of 80° C. or lower.

8. The method according to claim 1, wherein a temperature of the dispersion heated during the forming of the toner particles is at least 10° C. higher than a melting temperature of the releasing agent particles.

9. The method according to claim 1, wherein the anionic surfactant comprises a sulfonate having an alkyl group having 8 to 12 carbon atoms.

10. The method according to claim 9, wherein the anionic surfactant comprises at least one selected from the group consisting of sodium alkylbenzene sulfonate and sodium alkyl sulfonate.

11. The method according to claim 1, wherein, in the adding of the anionic surfactant, addition of the surfactant involves adding a surfactant dispersion having an anionic surfactant concentration of 25 mass % or less.

12. The method according to claim 1, wherein, in the adding of the anionic surfactant, an amount of the anionic surfactant added relative to 100 parts by mass of the aggregated particles in which aggregation of the resin particles has been terminated is 0.02 parts by mass or more and 1.5 parts by mass or less.

13. The method according to claim 1, wherein, in the adding of the anionic surfactant, an addition rate of the anionic surfactant relative to 100 parts by mass of the aggregated particles in which aggregation of the resin particles has been terminated is 0.02 parts by mass/minute or more and 2.0 parts by mass/minute or less.

14. A toner for developing an electrostatic charge image, the toner being obtained by the method according to claim 1.

15. An electrostatic charge image developer comprising the toner for developing an electrostatic charge image according to claim 14.

16. A toner cartridge detachably attachable to an image forming apparatus, the toner cartridge comprising the toner for developing an electrostatic charge image according to claim 14.

17. A process cartridge detachably attachable to an image forming apparatus, the process cartridge comprising a developing unit that comprises the electrostatic charge image developer according to claim 15 and develops an electrostatic charge image on a surface of an image bearing member into a toner image by using the electrostatic charge image developer.

18. An image forming apparatus comprising:

an image bearing member;

a charging unit that charges a surface of the image bearing member;

an electrostatic charge image forming unit that forms an electrostatic charge image on the charged surface of the image bearing member;

a developing unit that comprises the electrostatic charge image developer according to claim 15 and develops the electrostatic charge image on the surface of the image bearing member into a toner image by using the electrostatic charge image developer;

a transfer unit that transfers the toner image on the surface of the image bearing member onto a surface of a recording medium; and a fixing unit that fixes the transferred toner image onto the surface of the recording medium.

19. An image forming method comprising:

charging a surface of an image bearing member;

forming an electrostatic charge image on the charged surface of the image bearing member;

developing the electrostatic charge image on the surface of the image bearing member into a toner image by using the electrostatic charge image developer according to claim 15;

transferring the toner image on the surface of the image bearing member onto a surface of a recording medium; and fixing the transferred toner image onto the surface of the recording medium.

* * * * *